US011419015B2

(12) United States Patent
Da Silva et al.

(10) Patent No.: US 11,419,015 B2
(45) Date of Patent: Aug. 16, 2022

(54) TRIGGERED MEASUREMENT REPORTING FOR WIRELESS COMMUNICATIONS

(71) Applicant: Telefonaktiebolaget LM Ericsson (publ), Stockholm (SE)

(72) Inventors: Icaro L. J. Da Silva, Solna (SE); Helka-Liina Määttanen, Helsinki (FI); Pradeepa Ramachandra, Linköping (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 686 days.

(21) Appl. No.: 16/316,431

(22) PCT Filed: Nov. 23, 2018

(86) PCT No.: PCT/SE2018/051207
§ 371 (c)(1),
(2) Date: Jan. 9, 2019

(87) PCT Pub. No.: WO2019/108114
PCT Pub. Date: Jun. 6, 2019

(65) Prior Publication Data
US 2021/0345191 A1    Nov. 4, 2021

Related U.S. Application Data

(60) Provisional application No. 62/591,519, filed on Nov. 28, 2017.

(51) Int. Cl.
*H04W 4/00* (2018.01)
*H04W 36/00* (2009.01)
(Continued)

(52) U.S. Cl.
CPC ....... *H04W 36/0058* (2018.08); *H04W 24/10* (2013.01); *H04W 36/00837* (2018.08); *H04W 74/04* (2013.01); *H04W 76/19* (2018.02)

(58) Field of Classification Search
None
See application file for complete search history.

(56) References Cited

U.S. PATENT DOCUMENTS

2013/0044708 A1   2/2013  Kim et al.
2017/0230869 A1   8/2017  Kubota et al.
(Continued)

FOREIGN PATENT DOCUMENTS

EP   2890183 A1   7/2015
EP   3242509 A1   4/2017
(Continued)

OTHER PUBLICATIONS

RU Office Action for Patent Application No. 2020120978 dated Oct. 28, 2020.
(Continued)

*Primary Examiner* — Suhail Khan
(74) *Attorney, Agent, or Firm* — Baker Botts, LLP

(57) ABSTRACT

A method is performed by a wireless device in a network. The wireless device detects a triggering event related to a procedure for a handover from a source network node to a target network node in which the wireless device relies on downlink beam selection. The wireless device determines measurement information to include in a message to send to the target network node. The measurement information is obtained by measuring one or more beams according to at least one of a radio link management configuration, a beam management configuration, and a measurement configuration. In response to detecting the triggering event, the determined measurement information in the message is sent to the target network node.

15 Claims, 21 Drawing Sheets

(51) Int. Cl.
  *H04W 76/19* (2018.01)
  *H04W 24/10* (2009.01)
  *H04W 74/04* (2009.01)

(56) References Cited

U.S. PATENT DOCUMENTS

2017/0251460 A1* 8/2017 Agiwal ............. H04W 72/0406
2017/0288763 A1* 10/2017 Yoo ..................... H04B 7/063
2019/0037605 A1* 1/2019 Agiwal ................ H04W 24/10

FOREIGN PATENT DOCUMENTS

| JP | 2016540422 A | 12/2016 |
| RU | 2009120465 A | 12/2010 |
| WO | 2008054775 A2 | 5/2008 |
| WO | 2015089303 A1 | 6/2015 |
| WO | 2017123078 A1 | 7/2017 |

OTHER PUBLICATIONS

RU Search Report for Patent Application No. 2020120978 dated Oct. 28, 2020.
3GPP TSG RAN WG1 Meeting #90, Prague, Czechia, Aug. 21-25, 2017 (R1-1712300), "Discussion on mechanism to recovery from beam failure."
3GPP TSG RAN WG1 Meeting #91, Reno, USA, Nov. 27-Dec. 1, 2017 (R1-1720803), "Views on NR Beam Management."
3GPP TSG RAN WG1 Meeting 90bis, Prague, CZ, Oct. 9-13, 2017 (R1-1717605), "On Beam Management, Measurement and Reporting."
3GPP TSG-RAN WG2#99, Berlin, Germany, Aug. 21-25, 2017, (R2-1709845), "Summary of [NR-AH2#11][NR] Baseline."
PCT International Search Report and Written Opinion Re. Application No. PCT/SE2018/051207; dated Mar. 21, 2019.
Ericsson, Conditional Handover[online], 3GPP TSG RAN WG2 #97 R2-1700 864, Internet<URL:http://www.3gpp.org/ftp/tsg_ran/WG2_RL2/TSGR2_97/Docs/R2-1700864.zip.
Qualcomm Incorporated; Beam reporting and refinement during handover, 3GPP TSG RAN WG2 # 100 R2-1713890.
Office Action in Japanese Application No. 2020-528332 dated Jul. 13, 2021.
Examination Report issued by the Government of India, Intellectual Property India for Application No. 202017022188—Jul. 30, 2021.
PCT International Preliminary Report on Patentability Re. Application No. PCT/SE2018/051207 dated Mar. 9, 2020.
3GPP TS 38.331 V0.1.0 (Oct. 2017), 3rd Generation Partnership Project; Technical Specification Group Radio Access Network; NR; Radio Resource Control (RRC); Protocol specification: (Release 15).
PCT Invitation to pay additional fees and, where applicable, protest fee (PCT Article 17(3)(a) and Rule 40.1 and 40.2 (e)) Re. Application No. PCT/SE2018/051207; dated Feb. 1, 2019.
3GPP TSG-RAN WG2 Adhoc#2 on NR Qingdao, China, Jun. 27-29, 2017 (R2-1706705), "Baseline Handover Procedure for Inter gNB Handover in NR."
3GPP TSG-RAN2 Meeting #97, Athens, Greece, Feb. 13-17, 2017 (R2-1701130), "Measurement and Mobility Considering Beamforming."
3GPP TSG-RAN WG2 Meeting #99bis R2-1711360 Prague, Czech, Oct. 9-13, 2017, "Beam reporting and refinement during handover".
3GPP TSG-RAN WG2 #99-bis on NR Tdoc R2-1710850 Prague, Czech, Oct. 9-13, 2017, "Conditional Handover".
3GPP TSG-RAN2#99bis R2-1711482 Prague, Czech Republic, Oct. 9-13, 2017, "Beam selection for RACH procedure during HO".
Examination report in counterpart TW application.

* cited by examiner

TRIGGERED MEASUREMENT REPORTING FOR WIRELESS COMMUNICATIONS

PRIORITY

This nonprovisional application is a U.S. National Stage Filing under 35 U.S.C. § 371 of International Patent Application Serial No. PCT/SE20.18/051287 filed Nov. 23, 2018 and entitled "TRIGGERED MEASUREMENT REPORTING FOR WIRELESS COMMUNICATIONS" which claims priority to U.S. Provisional Patent Application No. 62/591,519 filed Nov. 28, 2017, all of which are hereby incorporated by reference in their entirety.

TECHNICAL FIELD

Certain embodiments of the present disclosure relate, in general, to wireless communications and, more particularly, to reporting measurements for configuring wireless communications.

BACKGROUND

Measurement Reporting and Handovers/SCG Change, SCG Addition in NR

As in Long Term Evolution (LTE), in New Radio (NR), an RRC_CONNECTED user equipment (UE) performs handovers when it needs to change cells. To support handovers, Secondary Cell Group (SCG) changes, and SCG additions, the source network node that the UE is connected to may configure the UE to perform measurements on neighbor cells. In NR, the network can configure the UE to perform measurements based on synchronization signal/physical broadcast channel (SS/PBCH) block (SSB) or channel state information reference signal (CSI-RS) (configured as UE-specific reference signals, i.e., network can configure different sets of CSI-RS resources for different UEs).

One of the reasons different reference signal (RS) types were standardized in NR is that while the network can transmit one of them in wide beams (typically the SSBs), the other could be transmitted in narrow beams (typically the CSI-RS resources). In general, the following tradeoff exists:
  Narrow beams improve the coverage, but increase the latency and overhead;
  Wide beams provide lower coverage, but improves latency and overhead;

According to the NR radio resource control (RRC) specifications, 38.331, the network may configure the UE to report the following measurement information based on SS/PBCH block(s):
  Measurement results per SS/PBCH block (e.g. beam level Reference Signal Received Power (RSRP), Reference Signal Received Quality (RSRQ) and signal-to-interference-plus-noise ratio (SINR) per SSB index);
  Measurement results per cell based on SS/PBCH block(s); SS/PBCH block(s) indexes.

The network may configure the UE to report the following measurement information based on CSI-RS resources:
  Measurement results per CSI-RS resource (e.g. beam level RSRP, RSRQ and SINR per CSI-RS resource configured for L3 mobility);
  Measurement results per cell based on CSI-RS resource(s);
  CSI-RS resource measurement identifiers (i.e. no measurement results are included).

Usage of Beam Measurements at Target Cells (or to be SCG PCell if SCG Addition)

Measurement results per SSB and CSI-RS resource are basically measurements per beam, associated to a given cell. And, when it is said that indexes are reported, no measurement results are reported, although the UE shall perform the measurements in order to decide which indexes to select. In NR, it is specified that these shall be L3 filtered, as described in the measurement model of 38.300. Both serving cell and neighbor cell beam measurements can be configured to be reported. At least the following purposes can be mentioned for these beam measurement information:

1. Enable the target cell (or the SCG PCell, in the case of SCG addition) to configure contention-free random-access channel (RACH) resources.

In NR, both contention based and contention free random access upon handovers and SCG change/addition are supported. In multi-beam operation, the network may configure the UE with a mapping between downlink (DL) beams and RACH resources to be used depending which DL beam is selected e.g. provided in the RRC re-configuration that triggers the handover or the SCG change/addition To know for which beams for a given incoming UE to provide associated contention free resources, the target benefits in knowing beam measurement information for each incoming UE so that it does not have to configure free resources for all available DL beams, which could be a waste of RACH capacity. Notice that the best beam of a given cell may change from the time the UE sends the report, the source decides to handover and target prepares contention free RACH resources, network may configure the UE to report multiple beams per cell so that the target has at least the possibility to prepare multiple contention free resources in case the best beam changes or previously best beam is no longer suitable. The network also provides the UE with one or multiple suitability thresholds for beam selection upon accessing the target cell. A fallback mechanism between dedicated RACH and common RACH is also defined. If network provides the UE with contention free resources for a subset of beams and, upon performing beam selection i.e. upon selecting one of these beams the UE transmits a RACH preamble, and does not receive a Random-Access Response (RAR) within a RAR time window, as long as the procedure failure timer is running, the UE is allowed to select another beam, possibly associated with contention free resources. Dedicated RACH resources for contention free access can either be mapped to SSBs or CSI-RS resources. Common RACH for contention based access can be provided for SSB only, at least in Release-15.

2. Enables the target cell to configure beam management resources to incoming UEs i.e. decide which CSI-RS resources or SSBs at the target cell (or to be SCG PCell in the case of SCG addition) should be monitored and reported by the UE over L1. It may also be used to enable the configuration of Radio Link Monitoring (RLM) beams i.e. reference signal resources to be monitored.

Beam management is an important feature in NR that does not exist with the same extent in LTE. It consists of intra-cell mobility where the UE moves from one beam to another via L1 (e.g. via downlink control information (DCIs)/physical uplink control channel (PUCCH)/physical downlink control channel (PDCCH) signalling) or medium access control (MAC) signalling (e.g. via MAC control elements (CEs)). As in inter-cell mobility, the network may also configure the UE to perform measurements on beamformed reference signals and report them. However, differently from what has been described, these are L1 measurements or information derived from measurements, such as channel quality indicators (CQIs) or channel state information (CSI), i.e., there is no L3 filtered measurements. Also, as these reports are supposed to help the network to define which DL beams to send data/control channels they would usually be transmitted in narrow beams. And, there could be a burden at the UE to measure and report all possible candidates. Hence, the beam management procedure in NR makes sure the UE is monitoring only the most relevant beams which may likely be a subset of all the narrow beams covering the cell or even monitoring the only beams transmitting something. In addition, as radio link monitoring (RLM) requires the configuration of a subset of beams to be monitored (i.e. SSB or CSI-RS resources), the network needs to know for an incoming UE which beams to configure for that purpose.

3. Enable the source node to take optimized handover decisions i.e. reducing handover/SCG failure rate, too early handovers, and ping-pong handovers.

When measurement reports are sent with multiple cells and, for each cell the beam information, the source network node may prioritize a target cell whose measurement report shows more beams with strong measurement quantity values. In other words, there could be potential target with higher cell quality, based on best beam measurements, but another cell with slightly lower quality but many more detected beams with decent quality, which could be more stable and having lower chance of failure. Notice that differently from 1/ and 2/ here the beam measurement information is used in the source node to take the handover or SCG addition/change decisions.

Beam Management in NR

For beam management, the network may configure the UE to perform different kinds of L1 measurements associated to one or multiple sets of beams (which in practice can be one or multiple sets of CSI-RS resources or possibly SSBs) such as RSRP, CQI, rank indicator (RI), pre-coding matrix indicator (PMI), contention resolution identity (CRI) etc. This configuration is different from radio resource management (RRM) configuration and is given in serving cell configuration. It includes reference signal configuration which gives the reference signals UE should consider and report configurations which describe what kind of reports (L1-RSRP, CSI) and a linkage between the reference signal configuration and reporting configuration.

Ideally the network would configure beams transmitted in all directions to be monitored by the UE and, the UE could either report the strongest or all of them so that the network could have full information about the UE perception in all possibly directions. However, that is not feasible, especially in higher frequencies where the number of beams can grow significantly. Hence, only subset of all beams in a cell can be measured and reported by the UE. FIG. 1 illustrates an example of configuring a subset of beams to be monitored and reported for beam management.

Beam Configurability for RLM in NR

One of the main differences in the NR radio link monitoring (RLM) functionality, compared to LTE, is that the RLM functionality in LTE is described in the specifications so that the UE actions do not depend on parameters configured by the network. On the other hand, in NR, due to the wide range of frequencies and diversity of envisioned deployments and services, RLM is a quite configurable procedure. In NR, the network may configure the UE to perform RLM based on: i) different RS types (SS/PBCH block and CSI-RS), ii) the exact resources to be monitored and the exact number to generate in sync/out of sync (IS/OOS) indications; and iii) the block error rate (BLER) thresholds so that measured SINR values can be mapped to them to generate IS/OOS events to be indicated to the higher layers.

RLM in NR is performed based on up to 8 (preliminary) RLM RS resources configured by the network, where:

1. One RLM-RS resource can be either one SS/PBCH block or one CSI-RS resource/port,
2. The RLM-RS resources are UE-specifically configured at least in case of CSI-RS based RLM.

When UE is configured to perform RLM on one or multiple RLM-RS resource(s),

1. Periodic IS (in-sync) is indicated if the estimated link quality corresponding to hypothetical PDCCH BLER based on at least Y=1 RLM-RS resource among all configured X RLM-RS resource(s) is above Q in threshold, and
2. Periodic OOS is indicated if the estimated link quality corresponding to hypothetical PDCCH BLER based on all configured X RLM-RS resource(s) is below Q out threshold.

There currently exist certain challenge in reporting beam measurements, e.g., as used in NR. For example, certain challenges exist with respect to how a target cell, upon handovers/SCG addition/SCG change and re-establishment knows which subset or subset of beams to configure the UE with for:

1. Beam management monitoring (i.e. L1 monitoring like CSI, CQI, RSRP) and reporting; and
2. RLM beams for monitoring.

Systems and methods described herein may address these technical challenges, as explained below in reference to certain example embodiments.

It is also known for a UE to send beam reporting in message 3, upon handover execution. FIG. 3 illustrates an example that may be used in contention-based random access (CBRA). In FIG. 3, the UE selects a "suitable" beam to send msg1 from the common RACH resources configuration associated with NR-SS carried in a handover command. Then, the gNB sends Msg2 (RAR), and the UE may do beam measurements based on the NR-SS, whose configuration is carried in NR-SS. Then, the UE sends Msg3 with a block index indicating to the gNB a better TX beam for subsequent data transmissions. After the gNB receives the beam report, it could use refined gNB-UE beam pair from Msg4.

There are some limitations in the abovementioned method. For example, the proposed method only sends a single "better TX beam," not a set or sets of beams. Further, the proposed method does not describe any determination or triggers for when these measurements and reports may be sent, i.e., this is either completely undefined or envisioned that these are always reported by the UE, which could be a waste as these are not always needed. Indeed, the proposed method also fails to address the problem described herein of beam management and RM configuration optimization, e.g., knowing the quality of multiple beams. Lastly, the proposed method only describes its use as part of a handover, and therefore does not address other procedures where the same RLM and beam management configuration occurs.

SUMMARY

According to an embodiment, a method is performed by a wireless device for transmitting uplink data. The method comprises detecting a triggering event related to a procedure for a handover from a source network node to a target network node in which the wireless device relies on downlink beam selection. The method further comprises determining measurement information to include in a message to send to the target network node. The measurement information is obtained by measuring one or more beams according to at least one of a radio link management configuration, a beam management configuration, and a measurement configuration. In response to detecting the triggering event, the method further comprises sending the determined measurement information in the message to the target network node.

According to another embodiment, a wireless device comprises a memory and processing circuitry. The memory is configured to store instructions. The processing circuitry is configured to execute the instructions. The processing circuitry is configured to detect a triggering event related to a procedure for a handover from a source network node to a target network node in which the wireless device relies on downlink beam selection. The processing circuitry is configured to determine measurement information to include in a message to send to the target network node. The measurement information is obtained by measuring one or more beams according to at least one of a radio link management configuration, a beam management configuration, and a measurement configuration. In response to detecting the triggering event, the processing circuitry is configured to send the determined measurement information in the message to the target network node.

According to yet another embodiment, a computer program product comprises a non-transitory computer readable medium storing computer readable program code. The computer readable program code comprises program code for detecting a triggering event related to a procedure for a handover from a source network node to a target network node in which the wireless device relies on downlink beam selection. The computer readable program code further comprises program code for determining measurement information to include in a message to send to the target network node. The measurement information is obtained by measuring one or more beams according to at least one of a radio link management configuration, a beam management configuration, and a measurement configuration. The computer readable program code further comprises program code for, in response to detecting the triggering event, sending the determined measurement information in the message to the target network node.

In certain embodiments, the method/wireless device/computer program code may include one or more further features:

In particular embodiments, the triggering event corresponds to receipt of a handover command.

In particular embodiments, the triggering event corresponds to receipt of a conditional handover command.

In particular embodiments, detecting the triggering event comprises determining that at least one beam measurement changed after reporting the beam measurement to the source network node. The message including the measurement information indicates to the target network node that the at least one beam measurement has changed. The message is sent to the target network node prior to completing the handover procedure.

In particular embodiments, determining that at least one beam measurement has changed comprises one or more of determining that a strongest beam has changed and determining that a power, a quality, or an interference associated with the at least one beam has changed.

In particular embodiments, the triggering event corresponds to determining to perform a RACH fallback procedure after sending a random-access attempt to the target node and not receiving a random-access response within a random-access response window.

In particular embodiments, the message including the measurement information is sent after receiving a random-access response from the target node.

In particular embodiments, the measurement information is included in a Msg3 of a random-access procedure with the target node or in a handover complete message.

In particular embodiments, the message including the measurement information indicates measurements associated with a set of downlink beams, wherein at least one of the downlink beams in the set is not a best beam.

In particular embodiments, the message including the measurement information comprise measurement information associated to SS/PBCH blocks, measurement information associated to CSI-RS resources, or both.

In particular embodiments, determining the measurement information comprises determining which types of events to configure as triggering events.

In particular embodiments, the method/wireless device/computer program code further comprises determining which message to use to send the measurement information.

In particular embodiments, determining measurement information comprises determining which measurements to include in the message.

In particular embodiments, determining measurement information comprises determining which measurements to be included in the message to the target network node upon accessing.

In particular embodiments, the method/wireless device/computer program code further comprises performing measurements to be included in the message including the measurement information to the target network node upon accessing.

According to an embodiment, a method is performed by a wireless device in a network. The method comprises detecting a triggering event related to a procedure for connection re-establishment or beam recovery to a network node in which the wireless device relies on downlink beam selection. The method further comprises determining measurement information to include in a message to send to the network node. The measurement information is obtained by measuring one or more beams according to at least one of a radio link management configuration, a beam management configuration, and a measurement configuration. In response to detecting the triggering event, the method further comprises sending the determined measurement information in the message to the network node.

According to another embodiment, a wireless device comprises a memory and processing circuitry. The memory is configured to store instructions. The processing circuitry is configured to execute the instructions. The processing circuitry is configured to detect a triggering event related to a procedure for connection re-establishment or beam recovery to a network node in which the wireless device relies on downlink beam selection. The processing circuitry is further configured to determine measurement information to include in a message to send to the network node. The measurement information is obtained by measuring one or more beams according to at least one of a radio link management configuration, a beam management configuration, and a measurement configuration. In response to detecting the triggering event, the processing circuitry is configured to send the determined measurement information in the message to the network node.

According to yet another embodiment, a computer program product comprises a non-transitory computer readable medium storing computer readable program code. The computer readable program code comprises program code for detecting a triggering event related to a procedure for connection re-establishment or beam recovery to a network node in which the wireless device relies on downlink beam selection. The computer readable program code further comprises program code for determining measurement information to include in a message to send to the network node. The measurement information is obtained by measuring one or more beams according to at least one of a radio link management configuration, a beam management configuration, and a measurement configuration. The computer readable program code further comprises program code for, in response to detecting the triggering event, sending the determined measurement information in the message to the network node.

In certain embodiments, the method/wireless device/computer program code may include one or more further features:

In particular embodiments, the triggering event corresponds to a detection of beam failure towards a source network node.

In particular embodiments, the message including the measurement information indicates measurements associated with a set of downlink beams, wherein at least one of the downlink beams in the set is not a best beam.

In particular embodiments, the message including the measurement information provides measurement information associated to SS/PBCH blocks, measurement information associated to CSI-RS resources, or both.

In particular embodiments, determining measurement information comprises determining which types of events to configure as triggering events.

In particular embodiments, the method/wireless device/computer program code further comprises determining which message to use to send the measurement information.

In particular embodiments, determining measurement information comprises determining which measurements to report in the message including the measurement information.

In particular embodiments, the method/wireless device/computer program code further comprises performing measurements to be included in the message including the measurement information to the network node.

According to an embodiment, a method is performed by a target network node. The method comprises a target network node, the method comprising using beam information obtained from a source network node during a handover procedure of a wireless device from the source network node to the target network node. The method further comprises receiving a message comprising measurement information from a wireless device during the handover procedure from the source network node. The method further comprises, in response to receiving the message comprising measurement information from the wireless device, updating resources related to at least one of a radio link management configuration, a beam management configuration, and a measurement configuration. The method further comprises communicating with the wireless device using the updated resources related to at least one of the radio link management configuration, the beam management configuration, and the measurement configuration.

According to another embodiment, a target network node comprises a memory and processing circuitry. The memory is configured to store instructions and the processing circuitry is configured to execute the instructions. The processing circuitry is configured to use beam information obtained from a source network node during a handover procedure of a wireless device from the source network node to the target network node. The processing circuitry is further configured to receive a message comprising measurement information from a wireless device during the handover procedure from the source network node. The processing circuitry is further configured to, in response to receiving the message comprising measurement information from the wireless device, update resources related to at least one of a radio link management configuration, a beam management configuration, and a measurement configuration. The processing circuitry is further configured to communicate with the wireless device using the updated resources related to at least one of the radio link management configuration, the beam management configuration, and the measurement configuration.

According to yet another embodiment, a computer program product comprises a non-transitory computer readable medium storing computer readable program code. The computer readable program code comprises program code for using beam information obtained from a source network node during a handover procedure of a wireless device from the source network node to the target network node. The computer readable program code further comprises program code for receiving a message comprising measurement information from a wireless device during the handover procedure from the source network node. The computer readable program code further comprises program code for, in response to receiving the message comprising measurement information from the wireless device, updating resources related to at least one of a radio link management configuration, a beam management configuration, and a measurement configuration. The computer readable program code further comprises program code for communicating with the wireless device using the updated resources related to at least one of the radio link management configuration, the beam management configuration, and the measurement configuration.

In certain embodiments, the method/target network node/computer program code may include one or more further features:

In particular embodiments, the target network node receives the message comprising measurement information from the wireless device before the target network node sends any beam measurement configuration request to the wireless device.

In particular embodiments, the measurement information is received in a Msg 3 of a random-access procedure with the wireless device or in a handover complete message.

In particular embodiments, the message comprising measurement information indicates measurements associated with a set of downlink beams, wherein at least one of the downlink beams in the set is not a best beam.

According to an embodiment, a method is performed by a network node. The method comprises receiving a message comprising measurement information from a wireless device during a connection re-establishment or beam recovery procedure. The method further comprises, in response to receiving the message comprising measurement information from the wireless device, updating resources related to at least one of a radio link management configuration, a beam management configuration, and a measurement configuration. The method further comprises communicating with the wireless device using the updated resources related to at least one of the radio link management configuration, the beam management configuration, and the measurement configuration.

According to another embodiment, a network node comprises a memory and processing circuitry. The memory is configured to store instructions. The processing circuitry is configured to execute the instructions. The processing circuitry is configured to receive a message comprising measurement information from a wireless device during a connection re-establishment or beam recovery procedure. The processing circuitry is further configured to in response to receiving the message comprising measurement information from the wireless device, updating resources related to at least one of a radio link management configuration, a beam management configuration, and a measurement configuration. The processing circuitry is further configured to communicating with the wireless device using the updated resources related to at least one of the radio link management configuration, the beam management configuration, and the measurement configuration.

According to yet another embodiment, a computer program product comprises a non-transitory computer readable medium storing computer readable program code. The computer readable program code comprises program code for receiving a message comprising measurement information from a wireless device during a connection re-establishment or beam recovery procedure. The computer readable program code further comprises program code for, in response to receiving the message comprising measurement information from the wireless device, updating resources related to at least one of a radio link management configuration, a beam management configuration, and a measurement configuration. The computer readable program code further comprises program code for communicating with the wireless device using the updated resources related to at least one of the radio link management configuration, the beam management configuration, and the measurement configuration.

Certain embodiments of the present disclosure may provide one or more technical advantages. For example, certain embodiments allow for measurement information to be sent to a target network node based upon a handover-related trigger. In this manner, a wireless device may provide the most up-to-date measurement information to the target network node, which may be different from measurement information received from the handing-over source node. As another example, the triggering event may be the re-establishment of a connection or a beam recovery action. Accordingly, a wireless device may send beam measurements without requiring the network node to determine different beams to measure and reconfigure the wireless device to obtain the beam measurements. As yet another example, certain embodiments provide a determination of whether a beam measurement has changed as part of the trigger detection process. In this manner, a wireless device may selectively choose when to send beam measurements, e.g., if the best beam has changed or if measured parameters have changed during the handover procedure or since re-establishment or beam recovery was initiated.

Certain embodiments may have none, some, or all of the above-recited advantages. Other advantages may be readily apparent to one having skill in the art.

BRIEF DESCRIPTION OF THE DRAWINGS

For a more complete understanding of the disclosed embodiments and their features and advantages, reference is now made to the following description, taking in conjunction with the accompanying drawings, in which.

DETAILED DESCRIPTION

Figure 1:
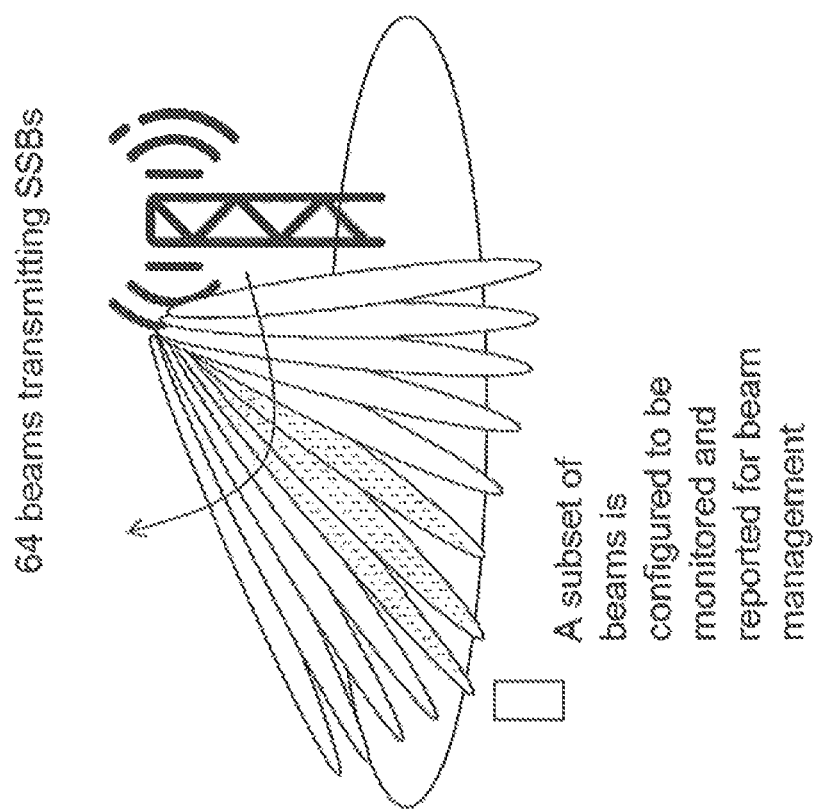
FIG. 1 illustrates an example of a configuration of a subset of beams to be monitored and reported for beam management, in accordance with certain embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

ments to the target cell so that the target can select the DL beams to provide dedicated RACH resource e.g., for contention-free access. Another way to use that information is to configure DL beams in the target cell for L1 monitoring and reporting (e.g., for beam management procedures) and to configure DL beams in the target for RLM. The information from source to target may be sent in the HandoverPreparationInformation message (or by any other suitable message or transmission).

Hence, when the UE accesses the target node, the target node might already have RSRP/RSRQ/SINR measurements because the source node might have sent them to the target node via HandoverPreparationInformation, as part of the RRM config., within CandidateCellInfoList. And, as in LTE the quality of these cells might not change dramatically from the time the UE sends the latest measurement reports to the source node (that would be sent to the target node) until the time the handover execution is performed.

It has been agreed that the source node can send both cell and beam measurements in HandoverPreparationInformation, as part of the RRM config, as agreed in RAN2 #99 Berlin:

---

2.2 As in LTE, the HandoverPreparationInformation to be transmitted from the source gNB to the target gNB can include the AS configuration, the RRM configuration and the AS context (including information necessary to handle handover failures). The details of the content of each IE are FFS.
4.2: As in LTE, to support CA case, the RRM configuration can include the list of best cells on each frequency for which measurement information is available.
5 Available beam measurement information can be part of the RRM configuration of the HandoverPreparationInformation message if beam measurement information (i.e. beam indexes and optionally measurement results) have been configured by the source gNodeB to be reported by a UE. That information is not a mandatory part of the HandoverPreparationInformation message
6 The RRM configuration can include both beam measurement information (for layer 3 mobility) associated to SS Block(s) and CSI-RS(s) for the reported cell (or cells depending on outcome of FFS above) if both types of measurements are available.
. . .

---

Baseline Solution: Beam Selection from RACH

A potential baseline solution for determining which beams to configure could be integrated with the multi-beam random access procedure defined in NR, where DL beams associated to the target cell to be selected by the UE are associated to the preamble the UE transmits and the RACH resource the UE should use in the UL. In other words, by detecting a selected preamble in a specific RACH resource the network knows the DL beam that the UE has selected to access the cell and knows how to send the RAR. On the other hand, according to current NR specifications it suffices that the DL beam is suitable (e.g., above a configurable threshold provided in handover command/SCG change/SCG addition configuration message), meaning the network cannot be certain that this is among the best beams. Hence, after the RAR is transmitted and the Handover is completed, the target node may need to re-configure the UE with beam management resources based on that beam, as that is most updated information available about the beam quality for the incoming UE. Accordingly, additional considerations may be implemented to address these issues.

Beam Selection from RACH+Beam Measurement Information Provided in Handover Preparation In certain embodiments, the source node can configure the UE to report beam measurement information associated to neighbor cells based on certain triggering measurement events. As in LTE, it has been agreed in NR that the source node can send, during handover preparation, these measure- Observation 1—In NR, as in LTE, the Source can Provide Beam and Cell Measurements Information to Target as Part of RRM-Config in Handover Preparation Information.

The main purpose of the cell measurements is to enable the target to possibly setup dual connectivity (DC) and/or carrier aggregation (CA), while beam measurements can be used in target to allocate contention free resources per beam or optimize handover decisions (e.g. by prioritizing cells with more stable beams). In addition, these beam measurements could also be used by target as input for the beam management configuration(s) to be provided to the UE e.g. to limit the amount of L1 beam reporting after the handover, a limited amount of CSI-RS resources are configured, and quasi co-located (QCL) with a subset of SS/PBCK blocks.

However, while previously performed cell measurements can be considered stable from the handover preparation until the handover execution, it has been acknowledged that beam measurements might not i.e. the best beams at the moment the UE sends the first measurement reports that may trigger a handover to the moment the UE finally receives the handover command may be different. And, for that reason, a RACH fallback mechanism has been agreed where the UE can use common resources when beam selection upon handovers lead to a beam that does not have contention free resources associated.

Observation 2—In NR, Best Beams of Target Cell May Change from the Time the Target Receives the HO Preparation to the Time the UE Performs HO Execution. Hence, a RACH Fallback Mechanism was Agreed in RAN2.

Figure 2:
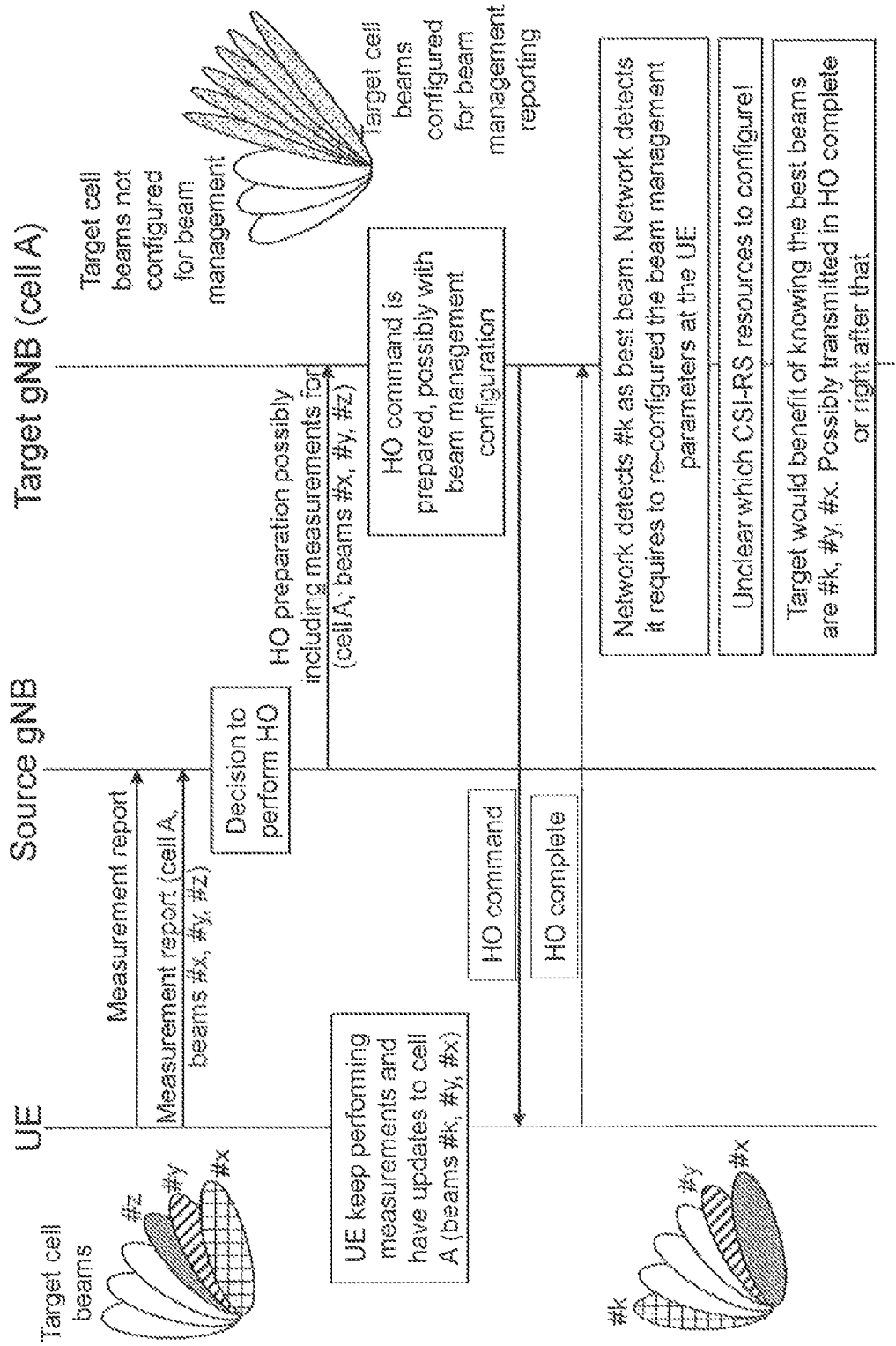
FIG. 2 illustrates an example signalling diagram showing a change in the best beams of the target cell in the time between receiving the handover preparation and the handover execution, in accordance with certain embodiments.
Figure 3:
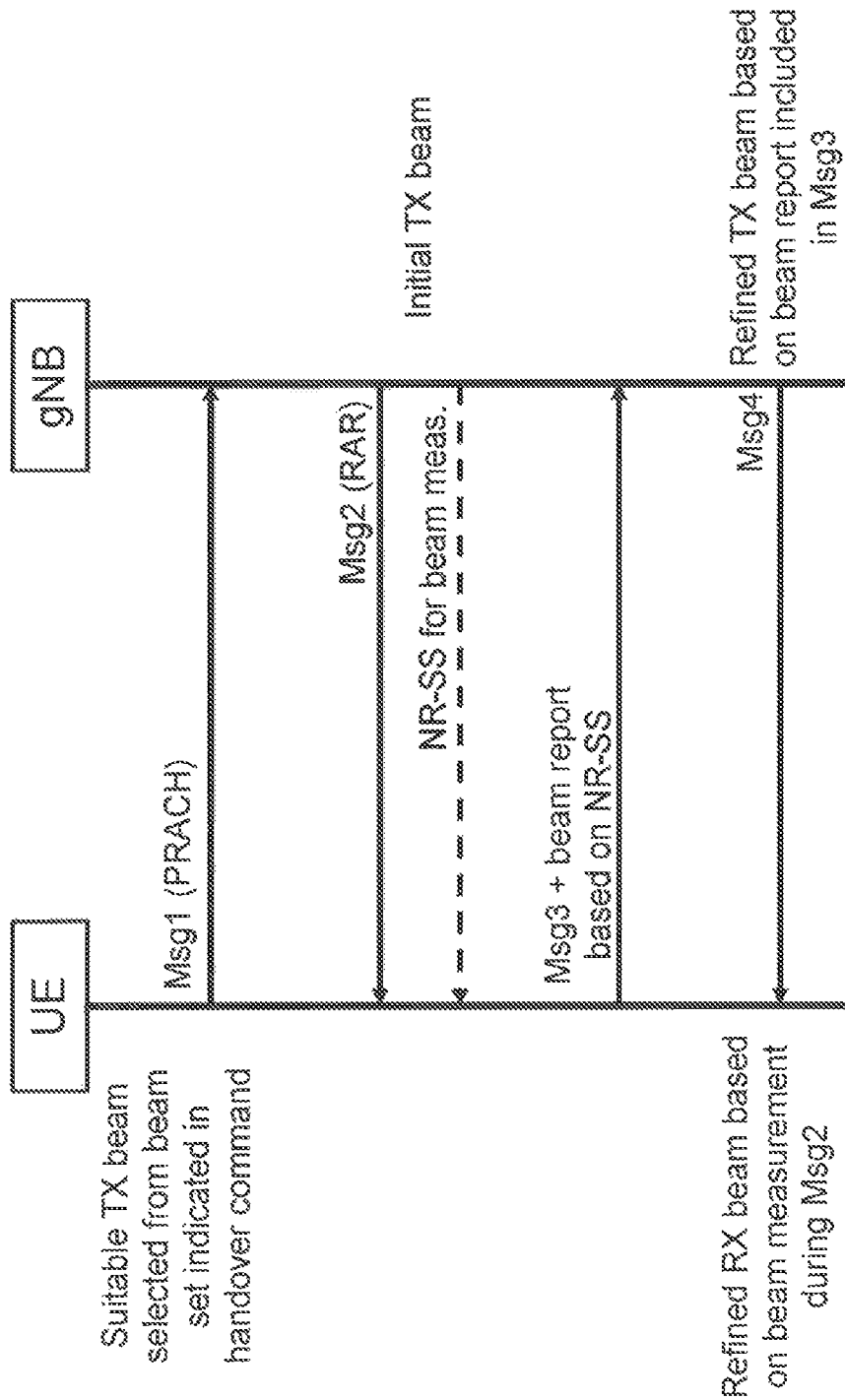
FIG. 3 illustrates an example signalling diagram showing a beam refinement procedure during a contention-based random access procedure, in accordance with certain embodiments.

FIG. 2 illustrates an example in which the best beams of the target cell may change from the time the target receives the HO preparation to the time the UE performs HO execution.

When that RACH fallback is used, the UE most likely has updated beam measurements and, it could be the case that beam management configurations and the RLM configurations provided in the handover command, possibly based on previous measurements, might not be the most optimized configurations.

Hence, a consequence could be that despite the RLM and beam management configurations being provided in the RRC Configuration (e.g. handover command, SCG addition/change command), upon accessing the target cell and start the initial beam measurement L1 reporting and RLM, the network may possibly send to the UE yet another RRC re-configuration to optimize the beams that shall be monitored. An even worse consequence could be the occurrence of beam failure and beam recovery procedure, which may be triggered if the RLM resources to be monitored are not properly configured e.g. UE configured to monitor and trigger failure based on beams that are not really providing decent quality.

There are, proposed herein, various embodiments which address one or more of the issues disclosed herein. For example, certain embodiments provide methods in a wireless device (such as a UE) for the triggering of the transmission of a measurement report at the target cell upon handover, connection re-establishments, SCG changes/SCG additions. Further described herein are various embodiments that: (1) provide different methods for triggering the beam/cell reports to the target i.e. indicating when the wireless device shall send these reports, (2) describe in which message to the target these measurements are reported, (3) describe which exact measurements are reported, (4) describe how the wireless device decides which measurements to be included in the measurement report to target upon accessing, and (5) describe how the wireless device performs these measurements to be included in the measurement report to target upon accessing. Embodiments 1-5 may be combined any suitable manner.

Certain embodiments may provide one or more of the following technical advantages. For example, certain embodiments use available measurements at the UE to help the target cell to re-configure RLM resources and beam management parameters. By doing that, the UE may access the target cell and avoid additional rounds of configurations and reporting until it is using an optimized configuration. No extra effort is required because the UE would perform these measurements anyway, at least until the procedure failure timer (like t307 in LTE, for the case of handover failure) is running and until an RRC Reconfiguration indicating to access a target cell is received, like a HO command or SCG addition or SCG change. In a setup with few beams, such features may not be required and may be turned off. By contrast, examples of systems that may benefit from the methods and systems disclosed herein include systems with multiple beams and systems with multiple transmission reception points (TRPs) where the beam management might be configured and managed by its own TRP entity.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In some embodiments a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), target device, a sensor equipped with UE, iPAD, Tablet, mobile terminals, smart phone, laptop embedded equipped (LEE), laptop mounted equipment (LME), USB dongles, Customer Premises Equipment (CPE) etc.

Additionally, in some embodiments generic terminology "network node", is used. It can be any kind of network node which may comprise of a radio network node such as base station, radio base station, base transceiver station, base station controller, network controller, gNB, en-gNB, nr-eNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), a core network node (e.g., MME, SON node, a coordinating node, positioning node (e.g. location server, SMLC, E-SMLC etc), MDT node, etc.), or even an external node (e.g., $3^{rd}$ party node, a node external to the current network), etc. The network node may also comprise a test equipment. Certain embodiments may be described by reference of a "source node" or a "target node." In some embodiments, the source node and target node are the same node. In some embodiments, the source node and target node are different nodes.

The term "radio node" used herein may be used to denote a UE or a radio network node.

The embodiments described herein are applicable to single carrier as well as to multicarrier operation of the UE. Examples of multicarrier operation are carrier aggregation (CA), multi-connectivity (MC) etc. In CA operation the UE is able to receive and/or transmit data to more than one serving cells. In MC the UE is served by at least two serving cells (e.g. PCell and PSCell) operated by two different network nodes. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly, the secondary serving cell is interchangeably called as secondary cell (SCell) or secondary serving cell (SSC).

The term "signaling" used herein may comprise any of: high-layer signaling (e.g., via RRC, NAS message or a like), lower-layer signaling (e.g., via a MAC, a physical control channel etc), or a combination thereof. The signaling may be implicit or explicit. The signaling may further be unicast, multicast or broadcast. The signaling may also be directly to another node or via a third node.

Sets of Embodiments for Triggering the Beam/Cell Reports to the Target

In a first set of embodiments, the occurrence of a handover execution, SCG change or SCG addition procedures, e.g., the reception of an RRC Configuration message that indicates that UE shall access a target cell, triggers the UE to send a beam/cell report to a target network node. In other words, a handover command (in LTE terms, an RRCConnectionReconfiguration with mobilityControlInfo; in NR terms, a synchronous RRC Reconfiguration) triggers the UE to send the beam/cell report to the target network node. The message may contain at least a target cell identifier, the frequency(ies) of the beamformed synchronization source signals (SS/PBCH Block) and the beamformed reference signals in the DL associated to the RACH resources to be used, where these RS can be the same SS/PBCH Block(s) and/or dedicated CSI-RS resources. The cell identifier in the message indicates that the UE should measure and report beams associated to that specific cell. An example signal flow graph related to these embodiments is given in FIG. 4 with the highlighted signal (HO command) acting as the trigger for reporting the measurements. While in the illustrated example, it is shown that the UE reports the logged measurements along with msg3, the UE may do so in any subsequent message as indicated below (see below "Message to the target in which these measurements are reported").

Figure 4:
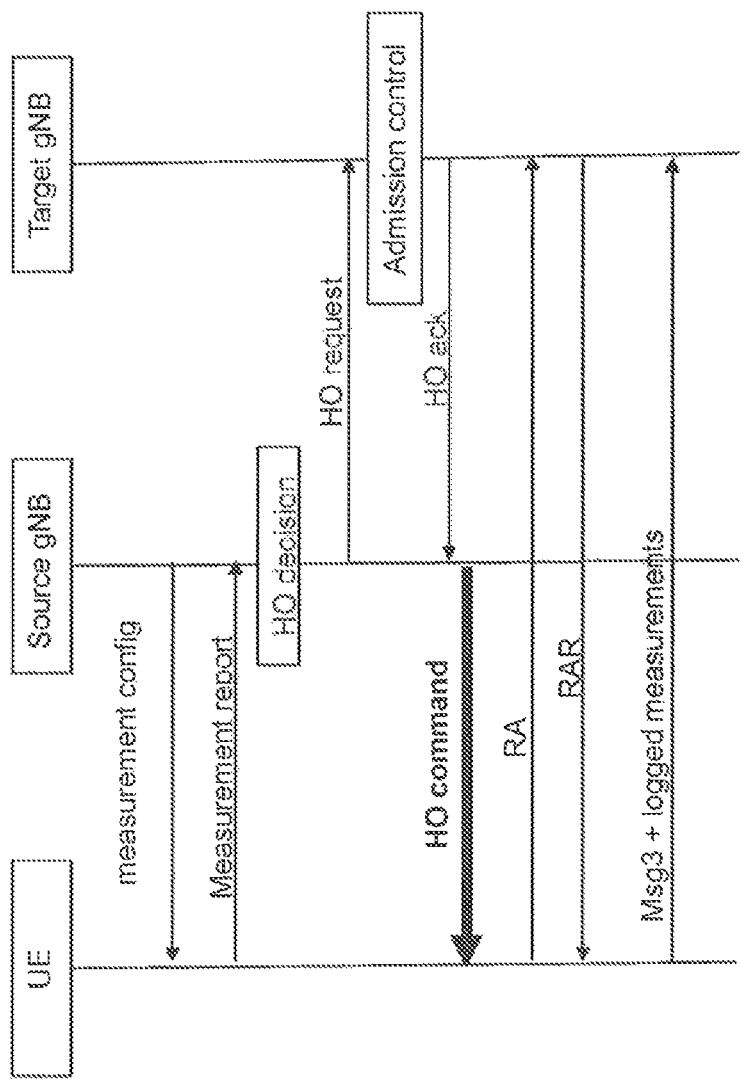
FIG. 4 illustrates an example signalling diagram showing a handover command triggering the reporting of measurements, in accordance with certain embodiments.
Figure 5:
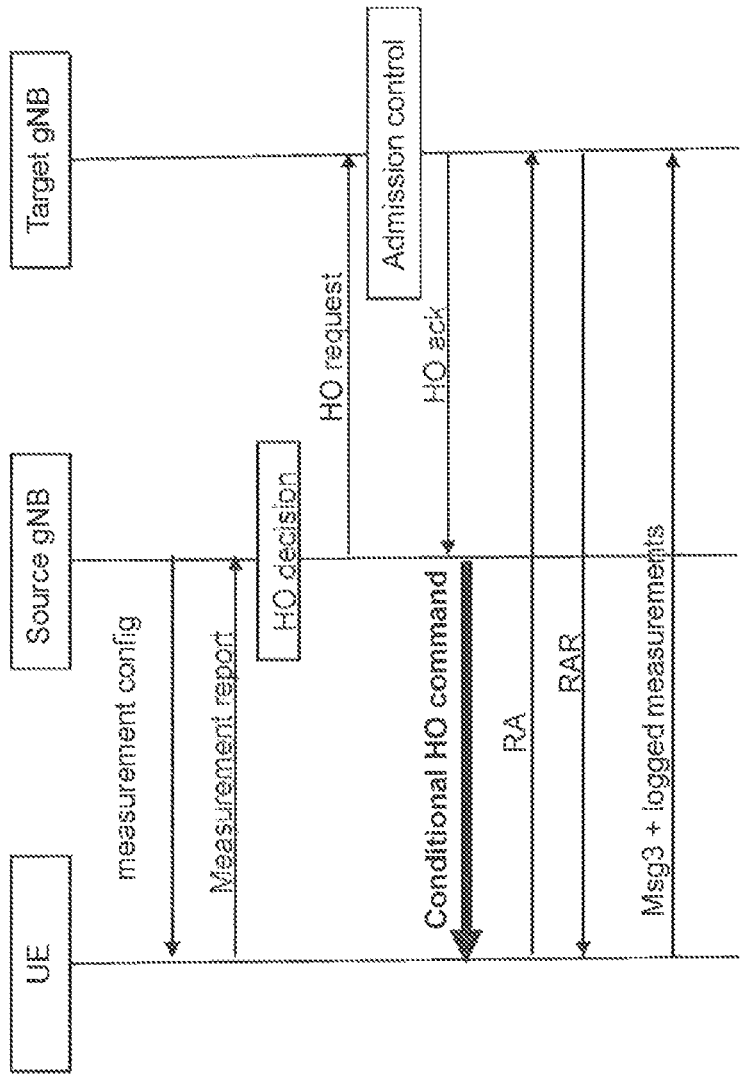
FIG. 5 illustrates an example signalling diagram showing a conditional handover command triggering the reporting of measurements, in accordance with certain embodiments.

In a second set of embodiments, the triggering event is the occurrence of a conditional handover execution, conditional SCG change or conditional SCG addition procedures, e.g., the reception of an RRC Configuration message that indicates that UE shall access one of a set of target cell upon the triggering of a configured condition. For example, if the serving cell quality becomes worse than a threshold and one of the configured targets becomes better than a threshold or serving cell quality becomes worse than one of the configured targets. In other words, a conditional handover command (In LTE terms, an RRCConnectionReconfiguration with mobilityControlInfo. In NR terms, a conditional synchronous RRC Reconfiguration). The message contains at least one or multiple target cell identifiers, the frequency(ies) of the beamformed synchronization source signals (SS/PBCH Block) per cell and the beamformed reference signals in the DL associated to the RACH resources to be used per cell, where these RS can be the same SS/PBCH Block(s) and/or dedicated CSI-RS resources. The cell identifiers in the message indicate that the UE should measure and report beams associated to one of the selected cells. An example signal flow graph related to the second set of embodiments is given in FIG. 5 with highlighted signal (Conditional HO command) acting as the trigger for reporting the measurements. While the illustrated example shows the UE reporting the logged measurements along with msg3, it is contemplated herein that the UE may report the logged measurements in any other suitable message as indicated below (see below "Message to the target in which these measurements are reported"). As shown in FIGS. 4 and 5, the UE may perform handover between a source gNB and a target gNB. As described above, the handover may be from a source cell associated to a source node to a target cell associated to a target node.

Figure 6:
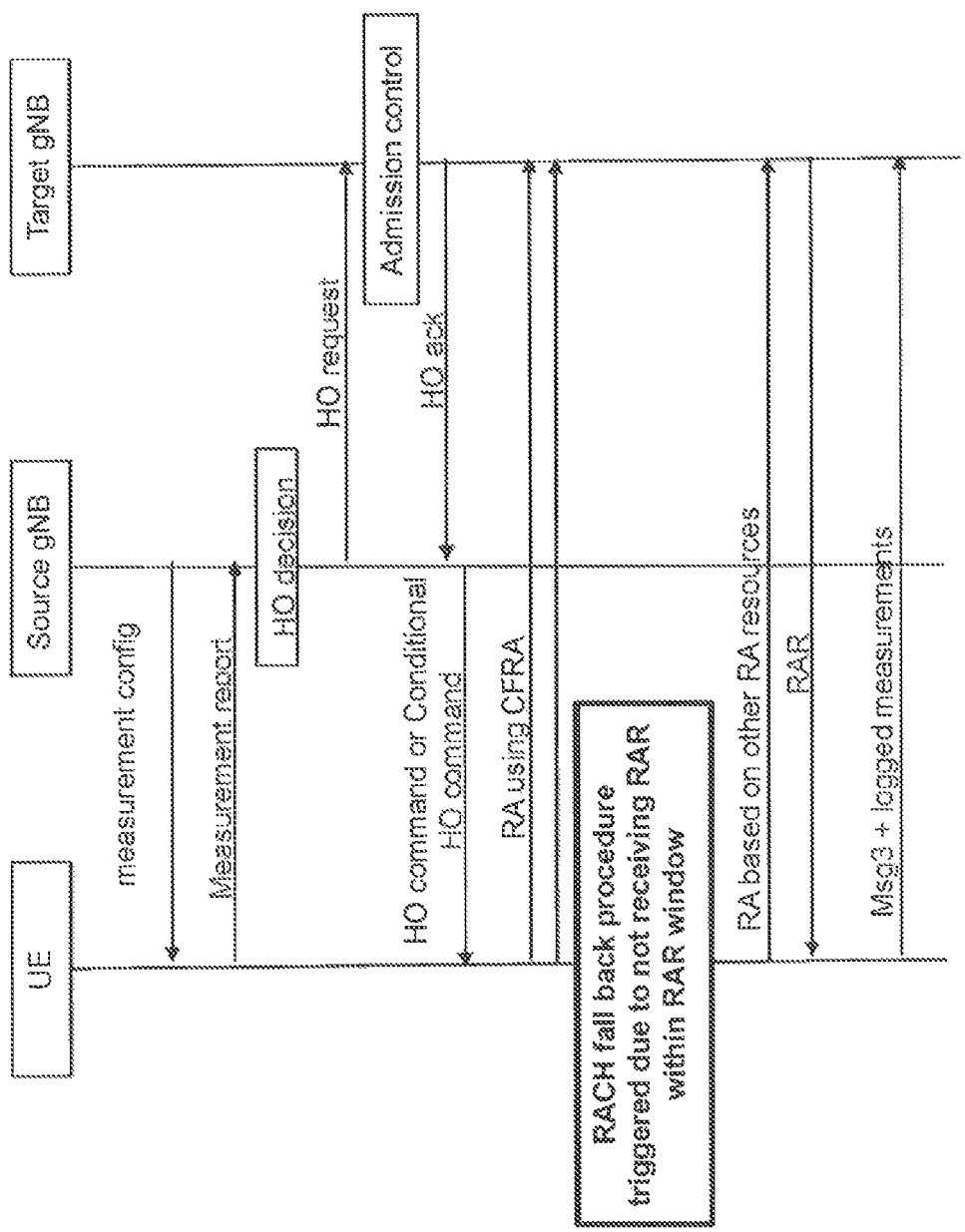
FIG. 6 illustrates an example signalling diagram showing a fall back procedure triggering the reporting of measurements, in accordance with certain embodiments.

In a third set of embodiments, the triggering event is the occurrence of a RACH fallback procedure upon accessing the target cell, e.g., when the UE selects a DL beam at the target cell (either with dedicated resource or common) and does not receive a RAR within the RAR window. Then, according to the RACH fallback procedure, the UE may select another beam and perform random access again and again after the end of each RAR time window and, as long as the "procedure failure timer" (e.g. Handover failure timer, like T307 in LTE) is running. Hence, when the UE succeeds in accessing the target cell with a RACH fallback procedure, as that is an indication that the beams the target has allocated for contention free RACH might have not be the best beams and, that the beam management and RLM resources configured in the RRC Configuration triggering the access might also not be the most optimized configuration, the UE sends a measurement report to target upon accessing it, where these measurements contain at least beam measurements associated to the target cell. An example signal flow graph related to the third set of embodiments is given in FIG. 6 with highlighted box (RACH fallback procedure) acting as the trigger for reporting the measurements. While the illustrated example shows the UE reporting the logged measurements along with msg3, it is contemplated herein that the UE may report the logged measurements in any other suitable message as indicated below (see below "Message to the target in which these measurements are reported").

Figure 7:
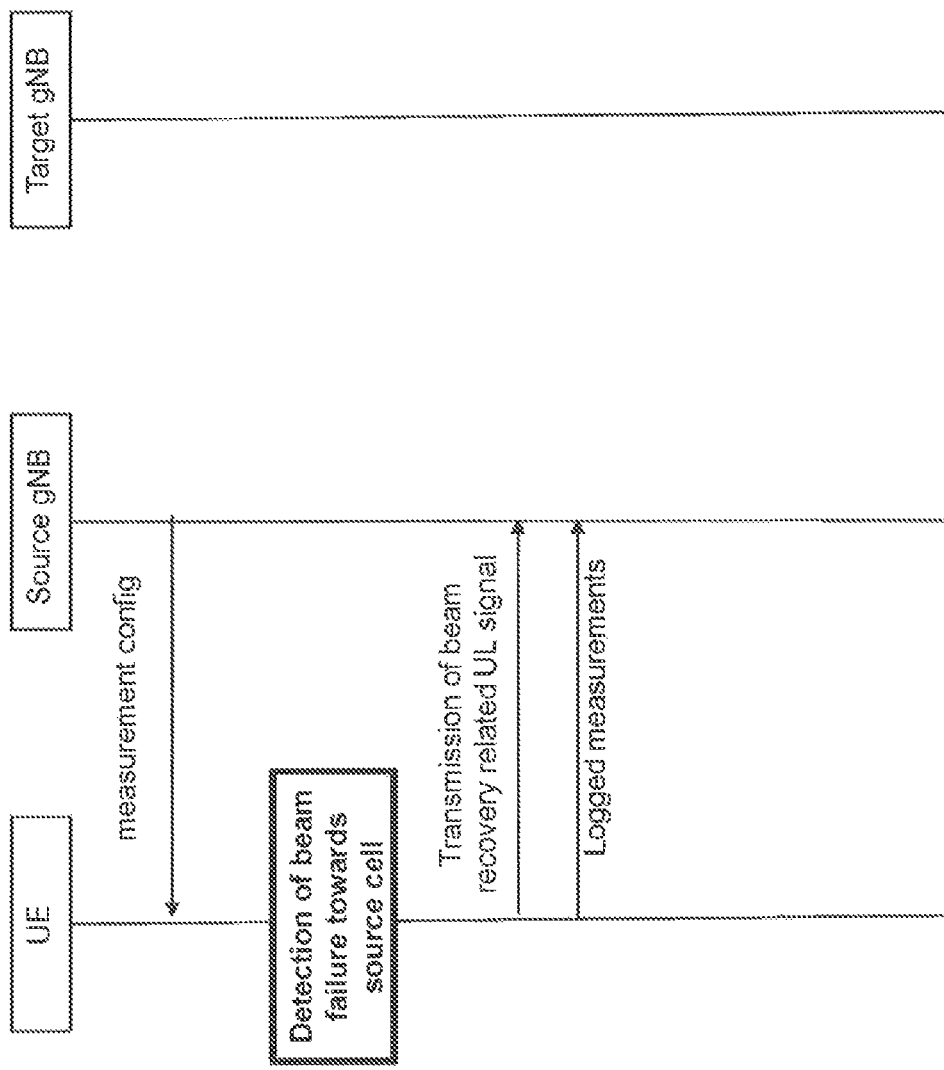
FIG. 7 illustrates an example signalling diagram showing the triggering of reporting measurements in response to detecting a beam failure, in accordance with certain embodiments.

In a fourth set of embodiments, the triggering event is the occurrence of a successful beam recovery procedure, e.g., the detection of beam failure, followed by the transmission on an UL signal on L1/L2, like a PRACH preamble, the monitoring of a MAC signalling message within a time window (like a RAR time window) and, upon the reception of that L1/L2 response from the network, that indicates that the beam recovery procedure has been successful, the measurement reporting with beam measurements to the target cell is triggered. Notice that the target cell can be the same as the source cell or a different cell (in the case multi-cell beam recovery is supported e.g., if UE is allowed to perform beam selection on beams associated to another cell different from the serving cell, upon beam failure detection). In one example, the UE always report available beam measurements upon receiving the response from the network confirming the successful beam recovery. In another example, the response message from the network can include a flag or parameter indicating the UE shall send available measurements after that message. An example signal flow graph related to the fourth set of embodiments is given in FIG. 7 with highlighted box (detection of beam failure towards source cell) acting as the trigger for reporting the measurements. The illustrated example depicts beam recovery within the same cell, but certain embodiments contemplate that beam recovery may be performed in target gNB (a different cell and/or node), such as in a multi-cell beam recovery scenario).

In a fifth set of embodiments, the triggering event is the occurrence of at least one beam recovery attempt failure upon beam recovery procedure, e.g., the detection of beam failure, followed by the transmission on an UL signal on L1/L2, like a PRACH preamble, the monitoring of a MAC signalling message within a time window (like a RAR time window) and, the expiring timer controlling that time window (like the RAR time window in random access procedure). The fact that the window expires, triggers the UE to perform another beam selection, and, that is the trigger to indicate the UE that beam measurements associated to the target cell shall be reported when and if the procedure succeeds e.g., upon the reception of that L1/L2 response from the network, that indicates that the beam recovery procedure has been successful, and, as the procedure had at least one failed recovery attempt, the measurement reporting with beam measurements to the target cell is triggered. Note that the target cell can be the same as the source cell or a different cell (in the case multi-cell beam recovery is supported. e.g., if UE is allowed to perform beam selection on beams associated to another cell different from the serving cell, upon beam failure detection). In some embodiments, the UE always report available beam measurements upon receiving the response from the network confirming the successful beam recovery. In some embodiments, the response message from the network can include a flag or parameter indicating the UE shall send available measurements after that message.

Figure 8:
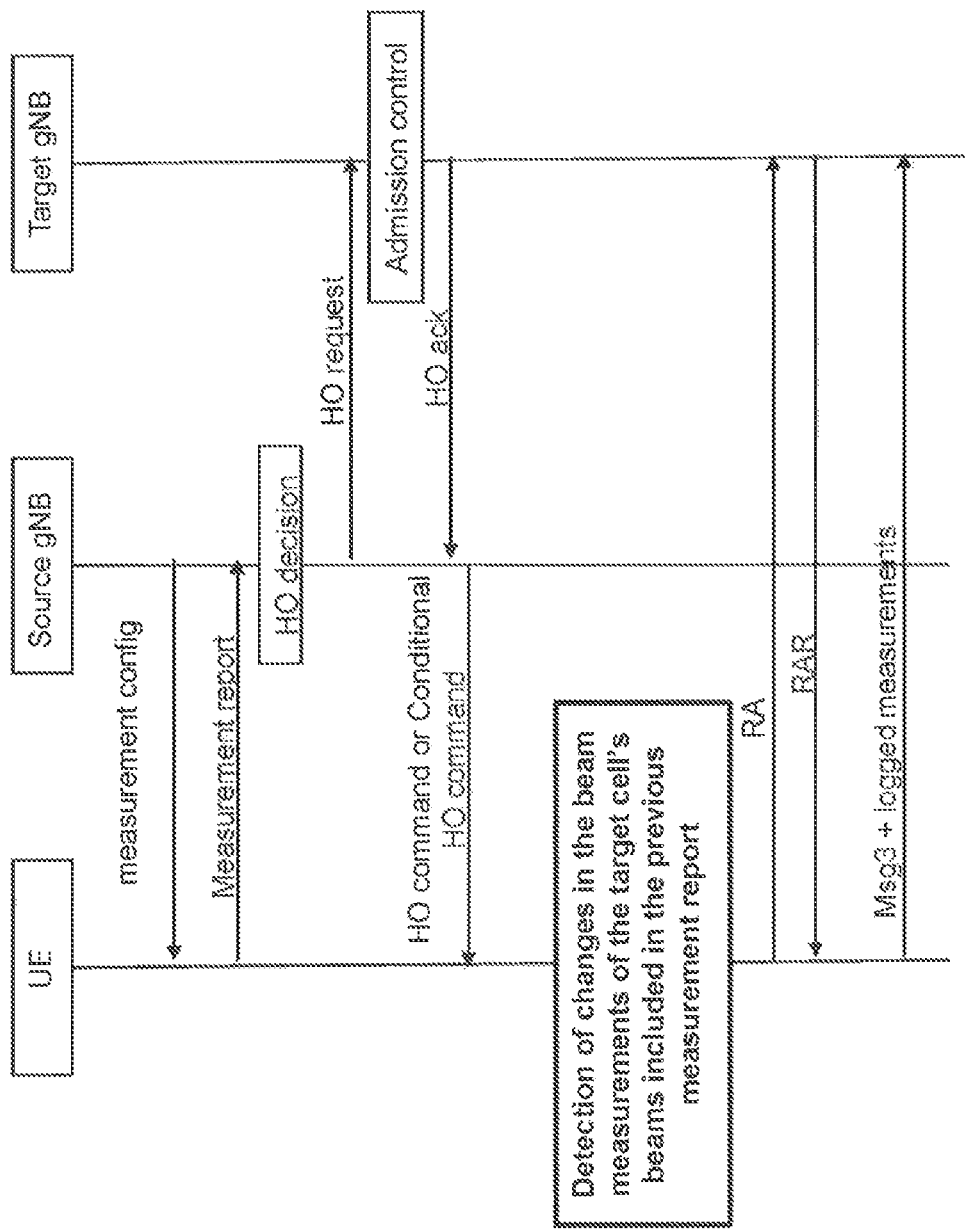
FIG. 8 illustrates an example signalling diagram showing the triggering of reporting measurements in response to detecting a change in beam measurements, in accordance with certain embodiments.

In certain embodiments, the triggering event may include the detection by the UE that beam conditions may have changed. In some embodiments, the beam change condition can be that the best beams included in previous measurement reports associated to the target cell have changed. In some embodiments, the beam change condition can be that the number of detected beams is different corresponding to the target cell. An example signal flow graph related to the fifth set of embodiments is given in FIG. 8 with highlighted box (detection of changes in the beam measurements) acting as the trigger for reporting the measurements. While the illustrated example shows the UE reporting the logged measurements along with msg3, it is contemplated herein that the UE may report the logged measurements in any other suitable message as indicated below (see below "Message to the target in which these measurements are reported").

In certain embodiments, the triggering event includes detecting by the UE that the beam measurements may have changed more than a threshold (e.g., beamQualityChangeThreshold). The beamQualityChangeThreshold can be configured, such as in the reportConfig or in the measID configuration. The UE may compute the difference between the beam level measurements as included in the latest measurement report as sent by the UE to the network and the beam level measurements as perceived by the UE at the time of reception of the RAR. If these measurements' difference exceeds the configured beamQualityChangeThreshold, then the UE may trigger the reporting to the target cell.

In certain embodiments, the triggering event includes detecting by the UE that the time from the first measurement report until the RRC Configuration triggering the access to target is above a defined threshold. In some embodiments, the detecting include a timer initiated at the transmission of each measurement report and determining, upon the timer expiring and the UE having not yet received an RRC Configuration triggering the access to target, that when it is received that the access to target should include the measurement report described in the invention.

In certain embodiments, the target cell configuration including measurement configuration received in the HO command, the UE is configured the triggering condition of the target cell quality measurements.

Message to the Target in which these Measurements are Reported

In certain embodiments, the measurement report is included in the Handover Complete message in the case of a handover.

In certain embodiments, the measurement report is included in the RRC Re-establishment Request message (or equivalent). In some embodiments, the UE participates in a SCG addition or change and if there is an equivalent message as the HO complete, the UE may include these beam measurements in the equivalent message. If there is not an equivalent message, a subsequent measurement report may be used to send the measurements, e.g., with a special measId or a measId configured by the target for that purpose.

In certain embodiments related to long term learning solutions such as SON functions, the UE includes the measurement report in a UE history information log (e.g., VisitedCellInfoList). This information may be provided by the UE in a UEInformationResponse message as a response to the UEInformationRequest message.

Which Measurements are Reported

In certain embodiments, the UE reports measurements associated to the target cell, such as:
1. Measurement information associated to SS/PBCH blocks:
   SSB index(es) according to one or multiple measurement quantities (e.g. RSRP, RSRQ or SINR);
   Measurement results per SSB index i.e. RSRP and/or RSQ and/or SINR per SSB beam;
   Cell measurement results based on SSB;
2. Measurement information associated to CSI-RS resources:
   Index(es) for CSI-RS resources (e.g. configured for L3 mobility), according to one or multiple measurement quantities (e.g. RSRP, RSRQ or SINR);
   Measurement results per CSI-Rs resource index i.e. RSRP and/or RSQ and/or SINR per CSI-RS beam;
   Cell measurement results based on CSI-RS; 3. Measurement information associated to both SSB and CSI-RS resources:
   SSB and CSI-RS indexes;
   SSB and CSI-RS measurement results;

In certain embodiments, the UE reports measurements associated to multiple cells, such as: i) neighbor cells in the same frequency, ii) all triggered cells from which beam measurement information is available, iii) best neighbors in each serving frequency on source, iv) beam measurement information on serving cells in source (in some embodiments the beam measurement information is on SCells after the SCG change/addition/handover).

In certain embodiments, the UE reports information associated to the RACH fallback procedure. In some embodiments, the UE reports that RACH fallback has occurred e.g. with a flag. More detailed information can also be reported. In some embodiments, the UE reports any of the abovementioned beam measurement information associated to the successful RACH procedure. In some embodiments, the UE reports the beam measurement information associated to all RACH attempts, indicating the failed ones and the successful ones. In some embodiments, the UE reports the number of failed RACH attempts, i.e., that is incremented at the UE until random access succeeds.

In certain embodiments, the UE reports information associated to the failed beam recovery attempts, in the case the triggering condition being the occurrence of failed attempts in beam recovery. In some embodiments, the UE reports that at least one or multiple failed attempts have occurred e.g., with a flag. More detailed information can also be reported. In some embodiments, the UE reports any of the abovementioned beam measurement information associated to the successful beam recovery procedure. In some embodiments, the UE reports the beam measurement information associated to all beam recovery attempts, indicating the failed ones and the successful one. In some embodiments, the UE reports the number of failed beam recovery attempts, i.e., that is incremented at the UE until beam recovery succeeds. In some embodiments, the beam recovery may be a different procedure compared to random access or, the same procedure with different parameters.

How the UE Decides which Measurements to be Included in the Measurement Report to Target Upon Accessing In certain embodiments the UE includes in the "measurement report to target upon accessing the target" all available beam measurement information associated to the target cell, e.g., any of the information described above in the previous section.

In one set of embodiments, the UE includes the measurement information according to configuration provided by the target in the RRC configuration message, e.g., in the case the triggering is an RRC Reconfiguration with target access, such as in the case of handovers, SCG changes, and/or SCG additions. In other words, the RRC message may contain an additional IE enabling the reporting feature and possibly including reporting configuration parameters for that beam measurement report upon accessing the target cell. From the network side, that can be an indication that the target node can benefit from that information, e.g., due to previous statics associated to incoming UEs from that serving cell.

In certain embodiments, that configuration is implicit, e.g., it is used for other purposes and, based on that configuration, the UE derives which exact measurements shall be performed and reported. For example, the UE selects what to report based on the RACH configuration provided in the RRC configuration as shown in the examples below.

Example A

If only common RACH resources are provided, based on SSB, UE include SSB measurements associated to the target cell;
If common RACH resources (based on SSB) and dedicated RACH resources are provided:
  If dedicated resources based on SSB, do not report beam measurements upon accessing. The reasoning is that the network will have some degree of knowledge of beam coverage.
  If dedicated based on CSI-RS, report SSB beam measurements; Here the reasoning would be that the preamble associated to CSI-RS would already provide the best CSI-RS beam to the network, hence, SSB would be an additional information to the network.

Example B

If only common RACH resources are provided, based on SSB, do not report beam measurements upon accessing the target. The reasoning is that the network will have some degree of knowledge of beam coverage already. That could be the case in deployments with few number of beams.
If common RACH resources (based on SSB) and dedicated RACH resources are provided:
  If dedicated resources based on SSB, report available CSI-RS beam measurements upon accessing if available. The reasoning is that the network may benefit from additional information concerning best narrow beams although the knowledge provided by preamble and RACH resources accessed is on suitable SSB.
  If dedicated based on CSI-RS, report available SSB beam measurements upon accessing if available. The reasoning is that the network may benefit from additional information concerning best narrow beams although the knowledge provided by preamble and RACH resources accessed is on suitable SSB.

In certain embodiments, the UE includes beam measurements according to a reporting configuration provided in the measConfig provided by the target cell that may contain a measurement identifier, possibly without any measObject association, so that the target identifies what the measurement report is about. In some embodiments, the measObject may be OPTIONAL in a measurement configuration. The measurement configuration may contain a reportConfig where a special reportType for that purpose can be defined, e.g., using targetAccesReport, which may optionally contain additional configurations or not. Note that the target may decide that because the target knows the UE's measConfig in source, e.g., as provided during the preparation phase (HO preparation, e.g., via the HandoverPreparationInformation message). In some embodiments, the measId is included in the measurement report so that the target cell identifies which measurement this is. In other embodiments, the measId may not be used anymore.

How the UE Performs these Measurements to be Included in the Measurement Report to Target Upon Accessing In certain embodiments, the UE perform measurements according to the configuration information provided by a source node, e.g., using measConfig, until the UE completes the procedure. In some embodiments, beam measurement information may be generated according to the configuration in each configured measId and associated reportConfig and measObject.

In certain embodiments in which the beam measurement information is associated with the target cell, the UE may perform measurements according to one or more consolidation thresholds configured by a configuration, e.g., measObject, associated to the target cell and using filter coefficients for beam measurements as configured, e.g., in quantityConfig. In some embodiments, different filter coefficients for L3 beam filtered measurements may be used based on CSI-RS and/or SSB.

In certain embodiments, the UE performs measurements according to the configuration information, e.g., measConfig, provided by the target node. In some embodiments, a special IE may be defined for this type of measurements or additional parameters defined in measConfig (or internal IEs). For example, filter coefficients only for measurements to be performed during beam selection for RACH upon accessing the target may be provided. They may be provided within a quantityConfig or as part of another IE.

In certain embodiments, the UE performs measurements according to the measConfig provided by the target. When receiving the target cell measConfig, UE may not discard and forget measurements and/or filtering previously performed according to source cell configuration but continues filtering the target cell/beam qualities.

Figure 9:
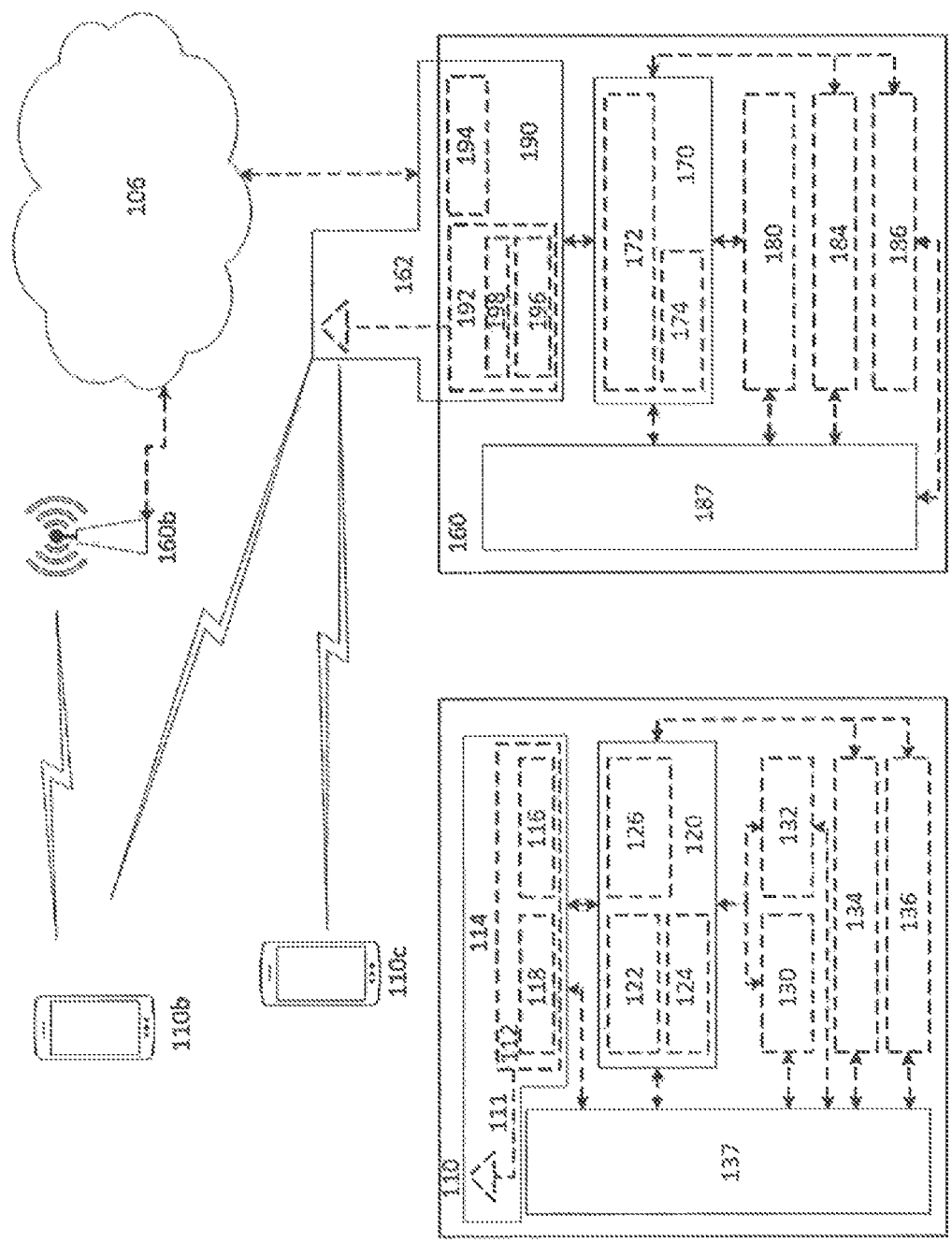
FIG. 9 illustrates an example wireless network, in accordance with certain embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 160 includes processing circuitry 170, device readable medium 180, interface 190, auxiliary equipment 184, power source 186, power circuitry 187, and antenna 162. Although network node 160 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 9 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 10:
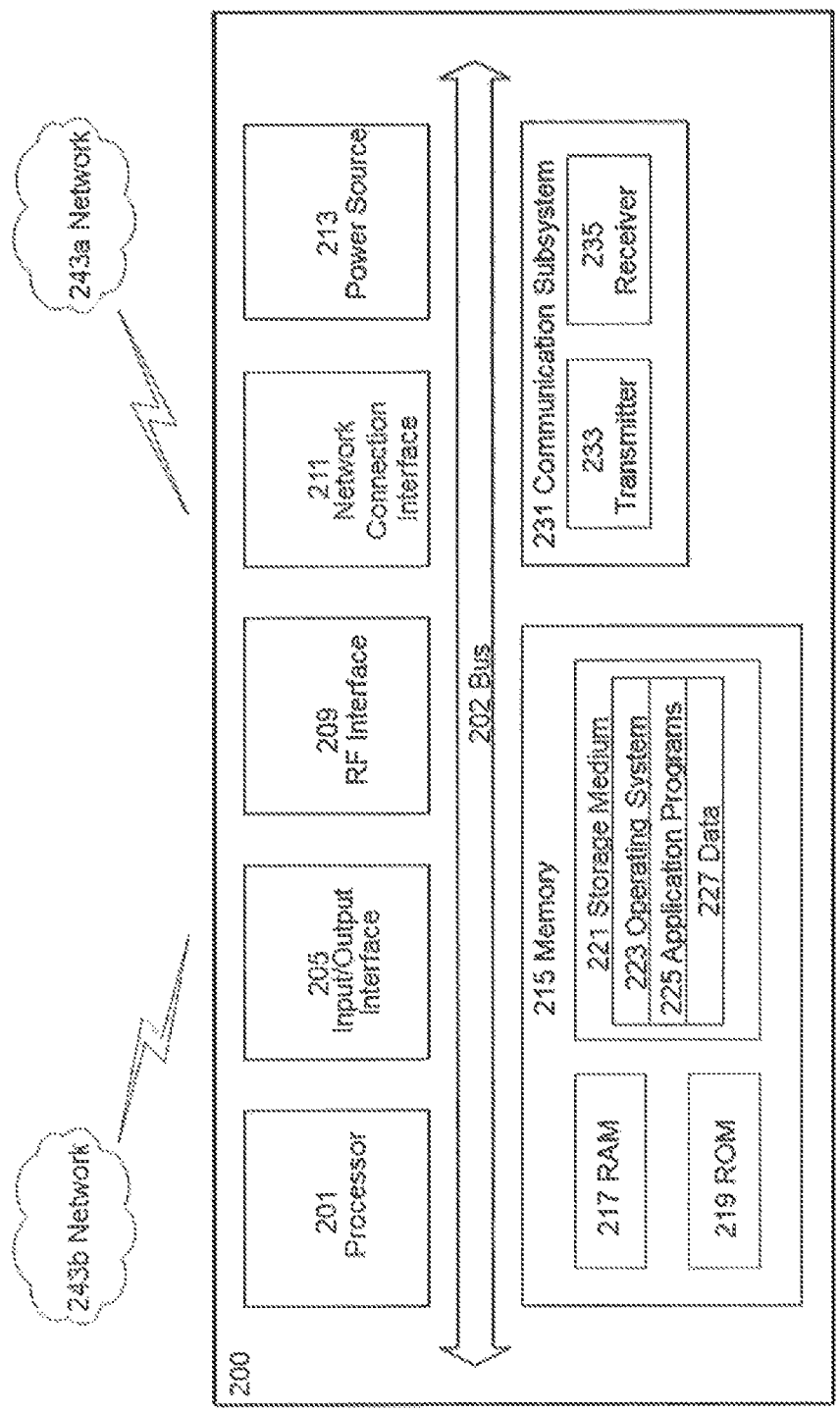
FIG. 10 illustrates an example user equipment, in accordance with certain embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 10, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 10, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 11:
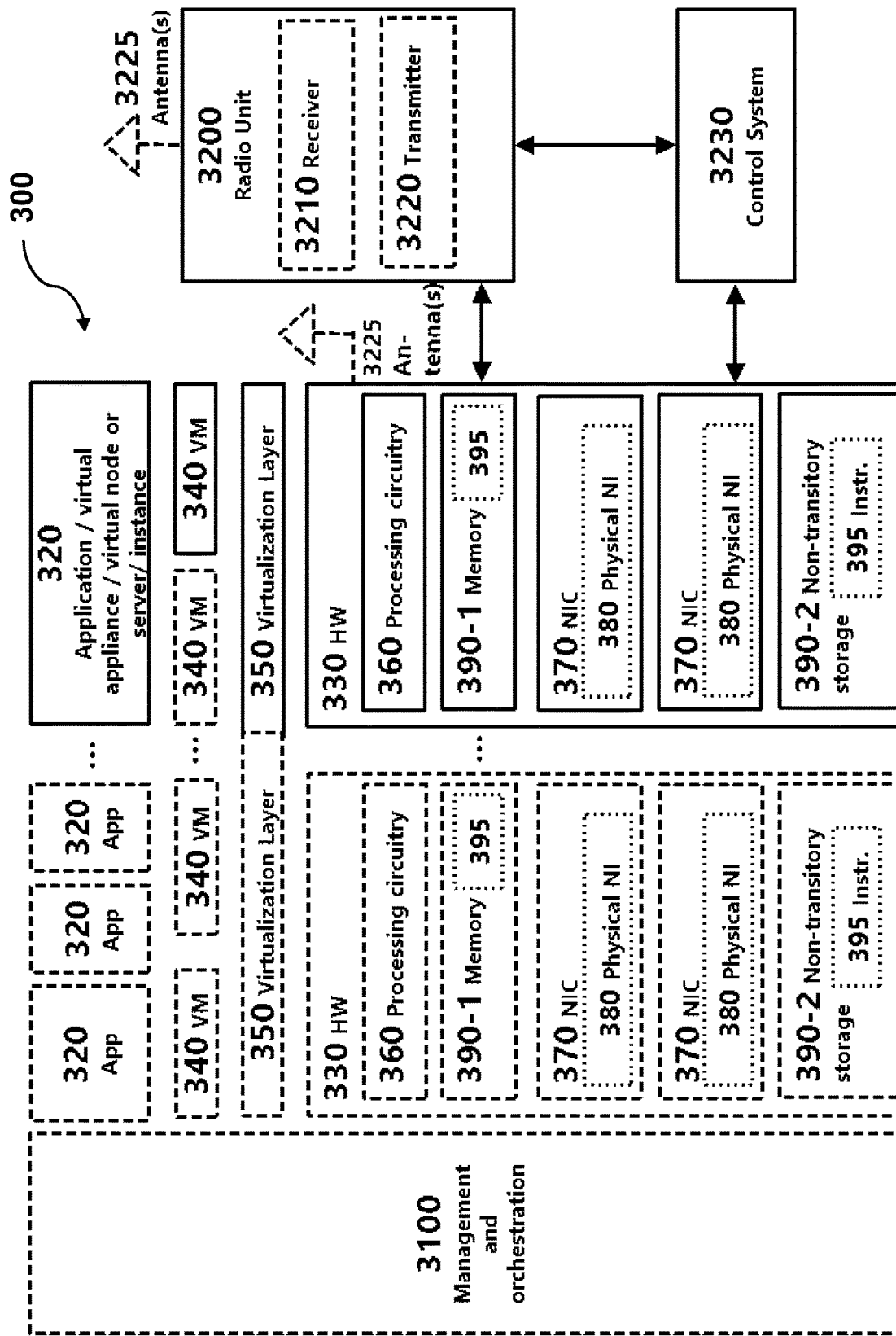
FIG. 11 illustrates an example virtualization environment, in accordance with certain embodiments.

FIG. 11 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 11, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 11.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 12:
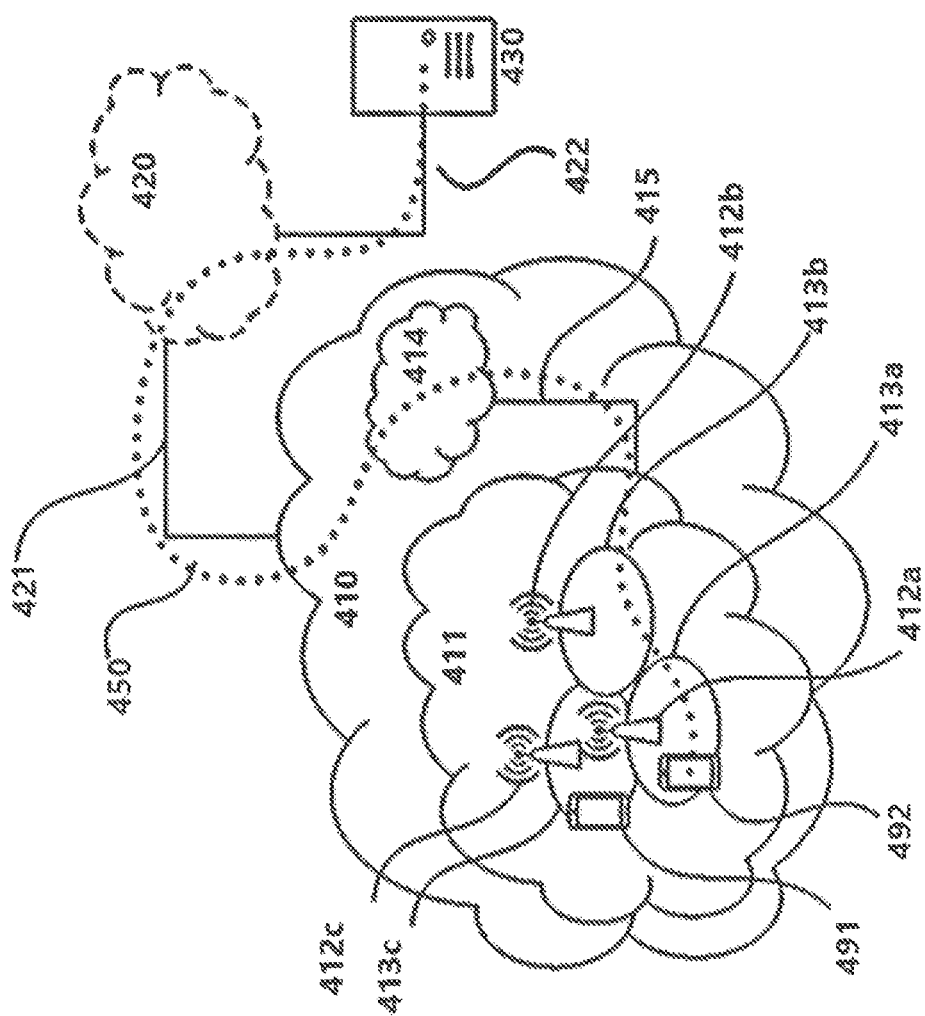
FIG. 12 illustrate an example telecommunication network connected via an intermediate network to a host computer, in accordance with certain embodiments.

With reference to FIG. 12, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 12 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 13. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 13) served by base station 520. Communication interface 526 may be configured to facilitate connection 560 to host computer 510. Connection 560 may be direct or it may pass through a core network (not shown in FIG. 13) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 13:
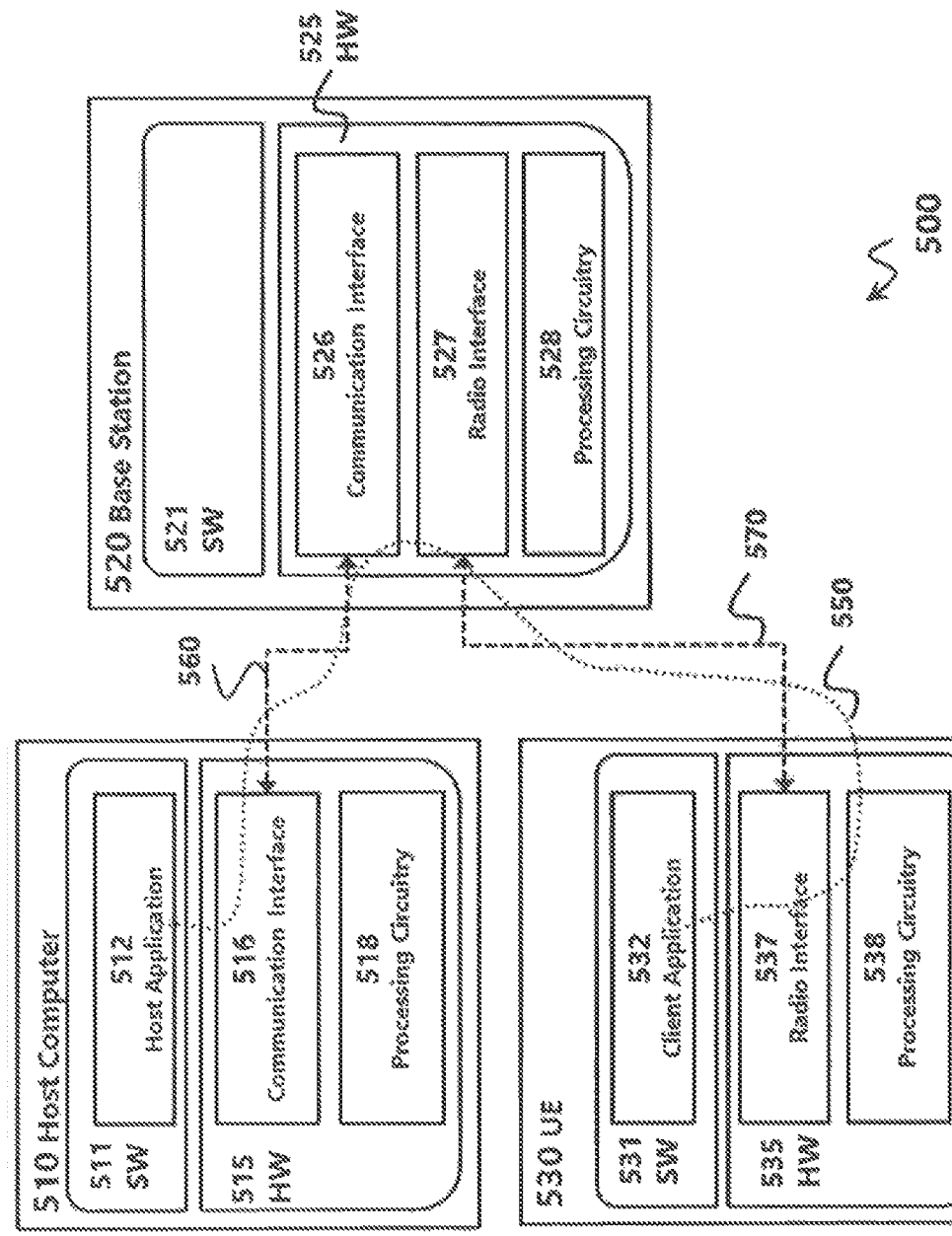
FIG. 13 illustrates an example host computer communicating via a base station with a user equipment over a partially wireless connection, in accordance with certain embodiments.

It is noted that host computer 510, base station 520 and UE 530 illustrated in FIG. 13 may be similar or identical to host computer 430, one of base stations 412a, 412b, 412c and one of UEs 491, 492 of FIG. 12, respectively. This is to say, the inner workings of these entities may be as shown in FIG. 13 and independently, the surrounding network topology may be that of FIG. 12.

In FIG. 13, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve latency and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 14:
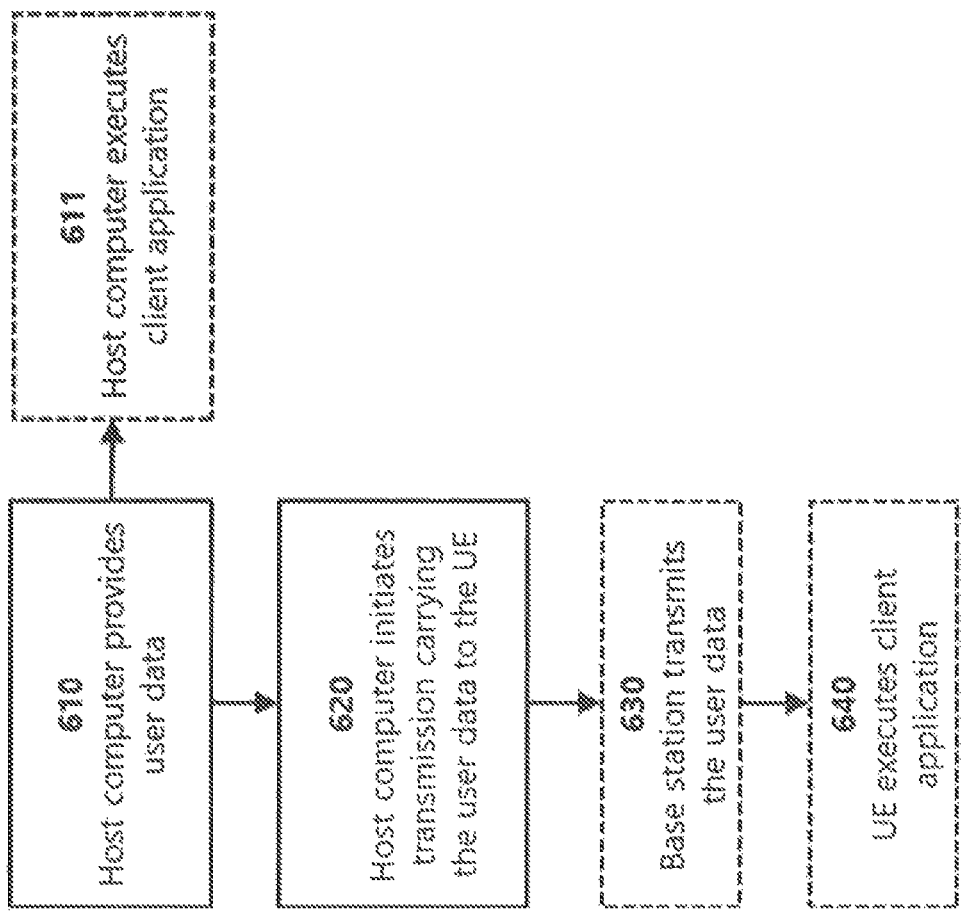
FIG. 14 is a flowchart illustrating an example method implemented in a communication system, in accordance certain embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 15:
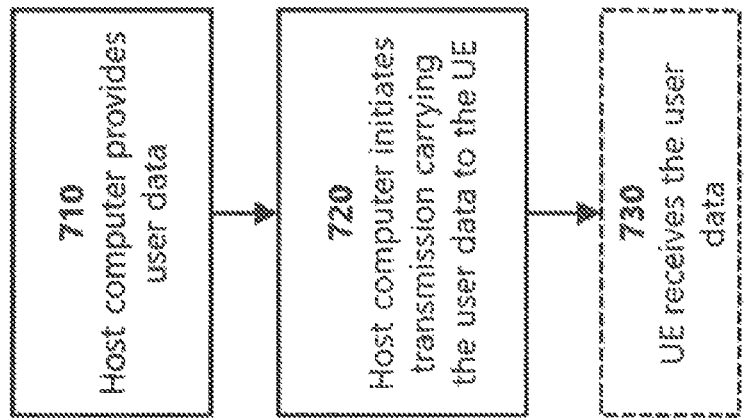
FIG. 15 is a flowchart illustrating a second example method implemented in a communication system, in accordance with certain embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 16:
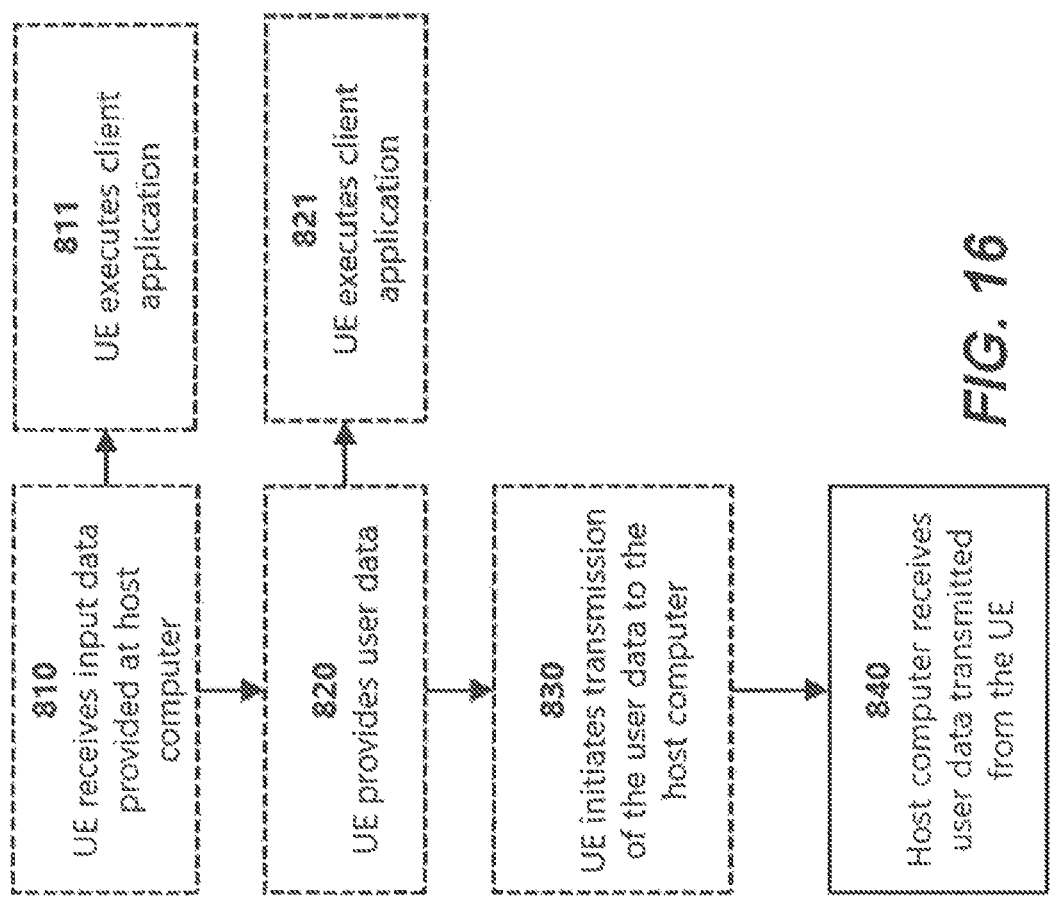
FIG. 16 is a flowchart illustrating a third method implemented in a communication system, in accordance with certain embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 17:
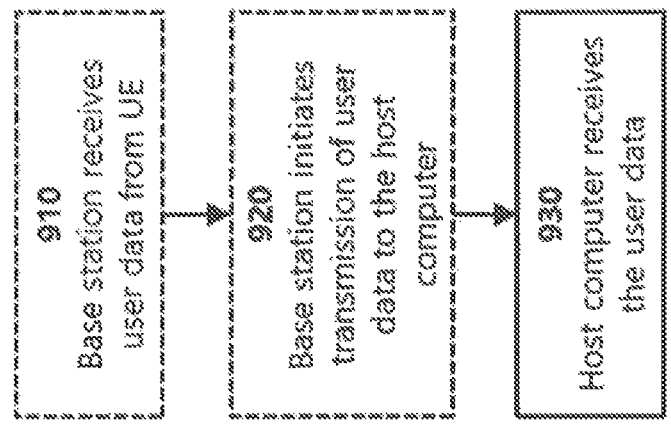
FIG. 17 is a flowchart illustrating a fourth method implemented in a communication system, in accordance with certain embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 18:
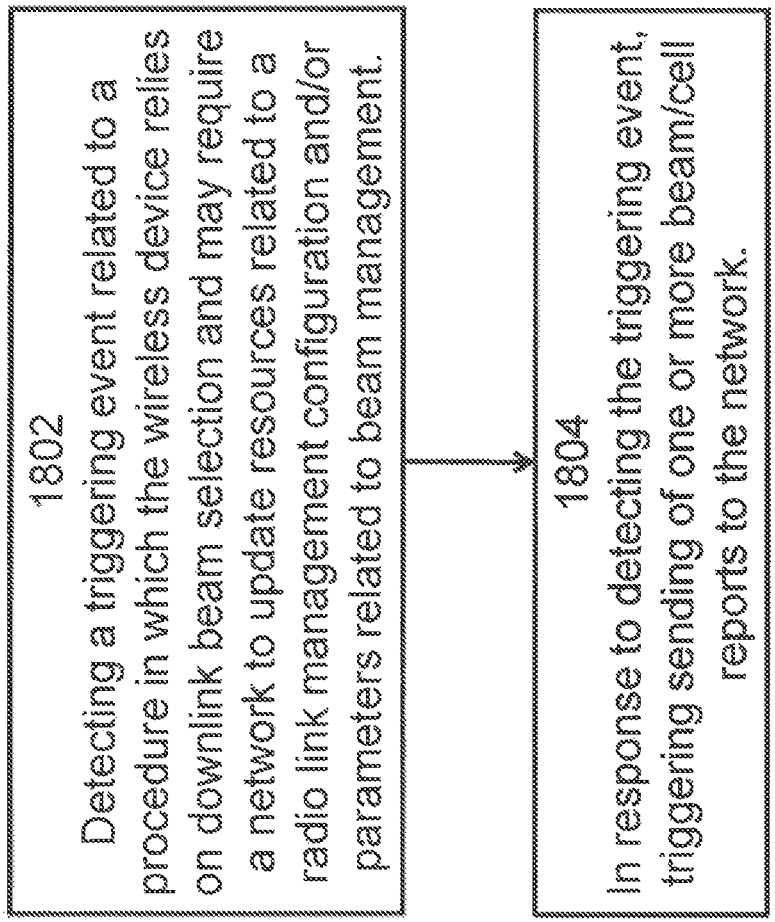
FIG. 18 illustrates an example method performed by a wireless device, in accordance with certain embodiments.

FIG. 18 depicts a method in accordance with particular embodiments. The method may be performed by a wireless device (such as a UE). The method begins at step 1802 with a detecting a triggering event related to a procedure in which the wireless device relies on downlink beam selection and may require a network to update resources related to a radio link management configuration and/or parameters related to beam management. Examples of such events connection re-establishment or resume, handovers, conditional handovers, SCG changes, and SCG addition, including the case of EN-DC where the added/changed SCG is an NR cell and the MCG PCell is an LTE cell, and beam recovery. Examples of triggering events include receipt of HO command (see e.g., FIG. 4), receipt of conditional HO command (see e.g., FIG. 5), determination to perform a RACH fallback procedure (see e.g., FIG. 6), detection of beam failure toward source cell (see e.g., FIG. 7), and detection of changes in beam measurements (see e.g., FIG. 8). The method proceeds to step 1804 with, in response to detecting the triggering event, triggering sending of one or more beam/cell reports to the network. Further details related to sending the one or more beam/cell reports to the network are further described above (see e.g., pp. 12-15, including the headings Message to the target in which these measurements are reported; Which exact measurements are reported; How the UE decides which measurements to be included in the measurement report to target upon accessing; and How the UE performs these measurements to be included in the measurement report to target upon accessing). In certain embodiments the beam/cell reports provide measurements for a set of beams (e.g., the set includes one or more beams that are not the best beam and optionally includes the best beam).

Figure 19:
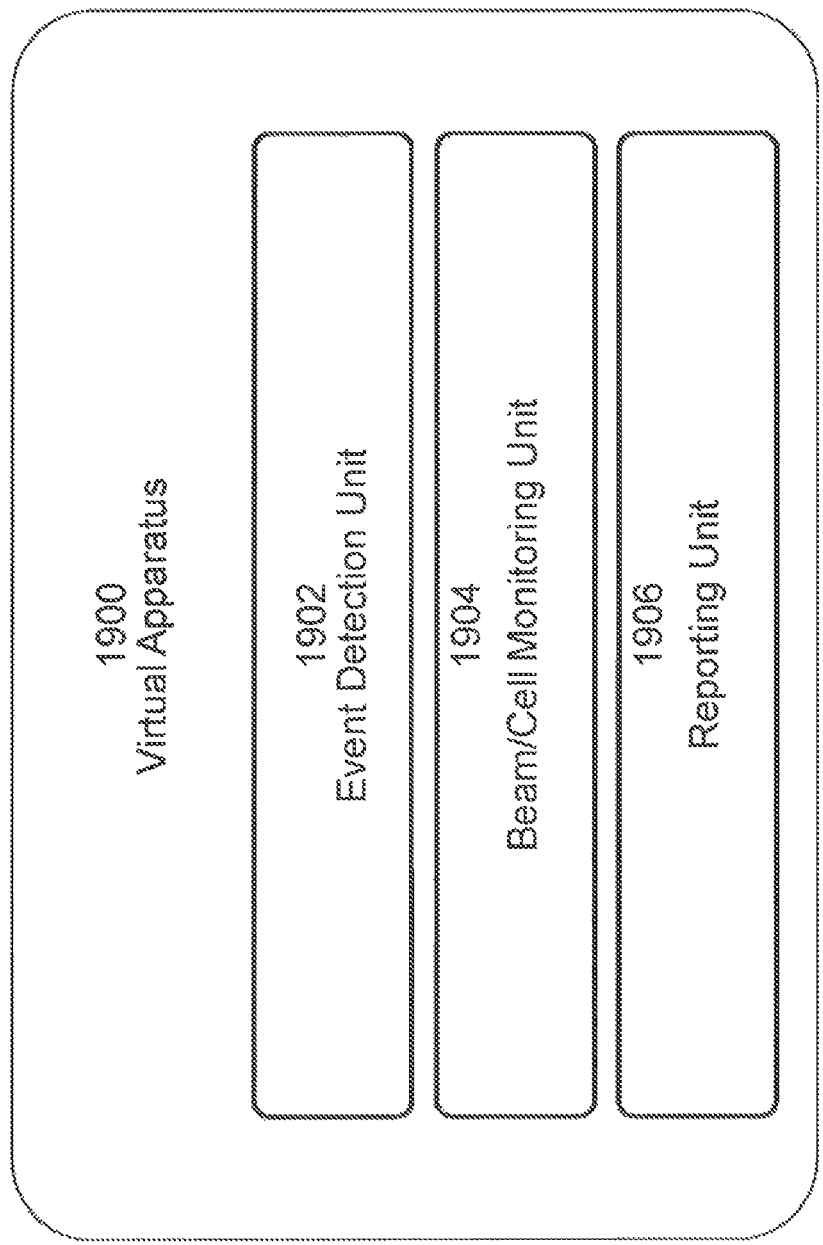
FIG. 19 illustrates a schematic block diagram of a first example apparatus in a wireless network, in accordance with certain embodiments.

FIG. 19 illustrates a schematic block diagram of an apparatus 1900 in a wireless network (for example, the wireless network shown in FIG. 9). The apparatus may be implemented in a wireless device (e.g., wireless device 110 in FIG. 9). Apparatus 1900 is operable to carry out the example method described with reference to FIG. 18 and possibly any other processes or methods disclosed herein. It is also to be understood that the method of FIG. 18 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Event Detection Unit 1902, Beam/Cell Monitoring Unit 1904, Reporting Unit 1906, and any other suitable units of apparatus 1900 to perform corresponding functions according one or more embodiments of the present disclosure.

As illustrated in FIG. 19, apparatus 1900 includes Event Detection Unit 1902, Beam/Cell Monitoring Unit 1904, and Reporting Unit 1906. Event Detection Unit 1902 is configured to detect a triggering event related to a procedure in which the wireless device relies on downlink beam selection and may require a network to update resources related to a radio link management configuration and/or parameters related to beam management. Beam/Cell Monitoring Unit 1904 is configured to monitor/perform measurements on beams/cells received by the wireless device. Reporting Unit 1906 is configured to report the measurements collected by beam/cell monitoring unit 1904 to the network. As one example, Reporting Unit 1906 may include beam/cell reports in a Msg 3 or in a handover complete message to a target node as part of a handover procedure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

SAMPLE EMBODIMENTS

Group A Embodiments

1. A method performed by a wireless device, the method comprising:
    detecting a triggering event related to a procedure in which the wireless device relies on downlink beam selection and may require a network to update resources related to a radio link management configuration and/or parameters related to beam management; and
    in response to detecting the triggering event, triggering sending of one or more beam/cell reports to the network.
2. The method of the previous embodiment, wherein the triggering event relates to a procedure for a handover to a target node and the triggering event triggers sending the one or more beam/cell reports to the target node.
3. The method of example embodiment 2, wherein triggering event corresponds to receipt of a handover command.
4. The method of example embodiment 2, wherein the triggering event corresponds to receipt of a conditional handover command.
5. The method of example embodiment 2, wherein the triggering event comprises detection of changes in beam measurements of the target node's beams after receipt of a handover command or a conditional handover command.
6. The method of embodiment 2, wherein the triggering event corresponds to determining to perform a RACH fallback procedure after sending a random access attempt to the target node and not receiving a random access response within a random access response window.
7. The method of any of embodiments 2-6, wherein the one or more beam/cell reports are sent after receiving a random access response from the target node.
8. The method of embodiment 7, wherein the one or more beam/cell reports are included in Msg 3 of a random access procedure with the target node or in a handover complete message.
9. The method of embodiment 1, wherein the triggering event relates to a procedure for connection re-establishment or beam recovery.
10. The method of embodiment 9, wherein the triggering event corresponds to detection of beam failure towards a source node.
11. The method of any of the previous embodiments, wherein the one or more beam/cell reports indicate measurements associated with a set of downlink beams, wherein at least one of the downlink beams in the set is not a best beam.
12. The method of any of the previous embodiments, wherein the beam/cell reports provide measurement information associated to SS/PBCH blocks, measurement information associated to CSI-RS resources, or both.
13. The method of any of the previous embodiments, further comprising determining which types of events to configure as triggering events.
14. The method of any of the previous embodiments, further comprising determining which message to use to send the one or more beam/cell reports.
15. The method of any of the previous embodiments, further comprising determining which measurements to report in the one or more beam/cell reports.
16. The method of any of the previous embodiments, further comprising determining which measurements to be included in the one or more beam/cell reports to target upon accessing.
17. The method of any of the previous embodiments, further comprising performing measurements to be included in the one or more beam/cell reports to target upon accessing.
18. The method of any of the previous embodiments, further comprising:
    providing user data; and
    forwarding the user data to a host computer via the transmission to the base station.

Group B Embodiments

19. A method performed by a target base station, the method comprising:
    receiving one or more beam/cell reports from a wireless device during a handover procedure from a source base station;
    in response to receiving the one or more beam/cell reports from the wireless device, updating resources related to a radio link management configuration and/or parameters related to beam management.
20. The method of claim 19, wherein the one or more beam/cell reports is received in a Msg 3 of a random access procedure with the wireless device or in a handover complete message.
21. A method performed by a base station, the method comprising:
    receiving one or more beam/cell reports from a wireless device during a connection re-establishment or beam recovery procedure;
    in response to receiving the one or more beam/cell reports from the wireless device, updating resources related to a radio link management configuration and/or parameters related to beam management.
22. The method of any of the previous embodiments, wherein the one or more beam/cell reports indicate measurements associated with a set of downlink beams, wherein at least one of the downlink beams in the set is not a best beam.
23. The method of any of the previous embodiments, further comprising:
    obtaining user data; and
    forwarding the user data to a host computer or a wireless device.

Group C Embodiments

24. A wireless device, the wireless device comprising:
    processing circuitry configured to perform any of the steps of any of the Group A embodiments; and
    power supply circuitry configured to supply power to the wireless device.
25. A base station, the base station comprising:
    processing circuitry configured to perform any of the steps of any of the Group B embodiments;
    power supply circuitry configured to supply power to the wireless device.
26. A user equipment (UE), the UE comprising:
    an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

27. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

28. The communication system of the pervious embodiment further including the base station.

29. The communication system of the previous 2 embodiments, further including the UE, wherein the UE is configured to communicate with the base station.

30. The communication system of the previous 3 embodiments, wherein:
the processing circuitry of the host computer is configured to execute a host application, thereby providing the user data; and
the UE comprises processing circuitry configured to execute a client application associated with the host application.

31. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

32. The method of the previous embodiment, further comprising, at the base station, transmitting the user data.

33. The method of the previous 2 embodiments, wherein the user data is provided at the host computer by executing a host application, the method further comprising, at the UE, executing a client application associated with the host application.

34. A user equipment (UE) configured to communicate with a base station, the UE comprising a radio interface and processing circuitry configured to performs the of the previous 3 embodiments.

35. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

36. The communication system of the previous embodiment, wherein the cellular network further includes a base station configured to communicate with the UE.

37. The communication system of the previous 2 embodiments, wherein:
the processing circuitry of the host computer is configured to execute a host application, thereby providing the user data; and
the UE's processing circuitry is configured to execute a client application associated with the host application.

38. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

39. The method of the previous embodiment, further comprising at the UE, receiving the user data from the base station.

40. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

41. The communication system of the previous embodiment, further including the UE.

42. The communication system of the previous 2 embodiments, further including the base station, wherein the base station comprises a radio interface configured to communicate with the UE and a communication interface configured to forward to the host computer the user data carried by a transmission from the UE to the base station.

43. The communication system of the previous 3 embodiments, wherein:
the processing circuitry of the host computer is configured to execute a host application; and
the UE's processing circuitry is configured to execute a client application associated with the host application, thereby providing the user data.

44. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

45. A method implemented in a communication system including a host computer, a base station and a user equipment (UE), the method comprising:

at the host computer, receiving user data transmitted to the base station from the UE, wherein the UE performs any of the steps of any of the Group A embodiments.
46. The method of the previous embodiment, further comprising, at the UE, providing the user data to the base station.
47. The method of the previous 2 embodiments, further comprising:
at the UE, executing a client application, thereby providing the user data to be transmitted; and
at the host computer, executing a host application associated with the client application.
48. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.
49. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
50. The communication system of the previous embodiment further including the base station.
51. The communication system of the previous 2 embodiments, further including the UE, wherein the UE is configured to communicate with the base station.
52. The communication system of the previous 3 embodiments, wherein:
the processing circuitry of the host computer is configured to execute a host application;
the UE is configured to execute a client application associated with the host application, thereby providing the user data to be received by the host computer.
53. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.
54. The method of the previous embodiment, further comprising at the base station, receiving the user data from the UE.
55. The method of the previous 2 embodiments, further comprising at the base station, initiating a transmission of the received user data to the host computer.

Figure 20:
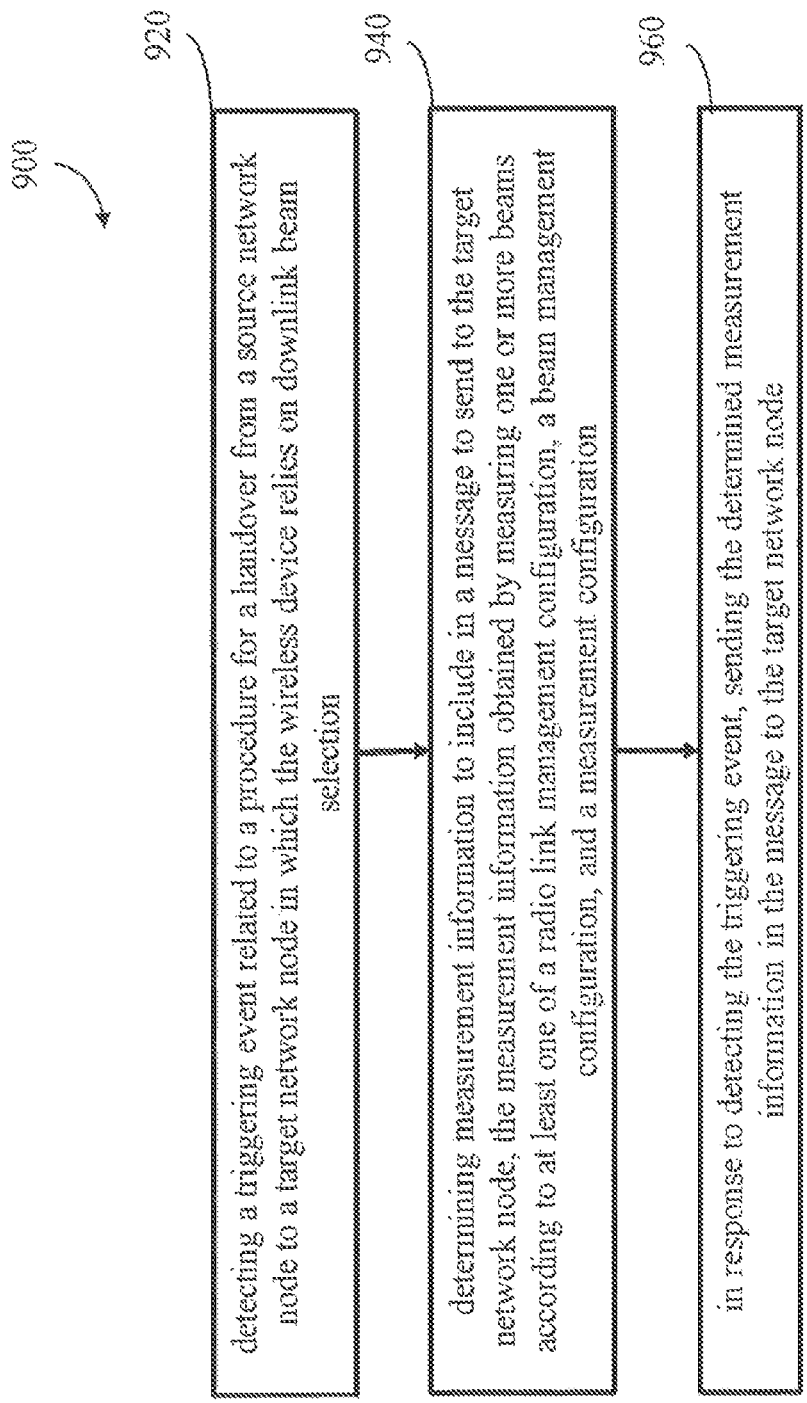
FIG. 20 illustrates a second example method performed by a wireless device, in accordance with certain embodiments.

FIG. 20 illustrates an example flowchart diagram of a method 900 for use in a wireless device, such as wireless device 110, 200, 330, 491, 492, or 530 described above. At step 920, the wireless device detects a triggering event related to a procedure for a handover from a source network node to a target network node in which the wireless device relies on downlink beam selection. For example, the triggering event may include receiving a handover command from the source network node or receiving a conditional handover command and/or determining that the conditions for handover have been met. In this manner, the wireless device may only send the measurement information if it is needed, e.g., because the triggering event indicates that downlink beam measurements are needed, or other criteria as discussed herein. In some embodiments, the wireless device determines which triggering events to detect, e.g., using implicit or explicit configuration information from the network.

In some embodiments, detecting the triggering event comprises determining that at least one beam measurement changed after reporting the beam measurement to the source network node. For example, this may include determining that a strongest beam has changed and/or that a power, a quality, or an interference associated with the at least one beam has changed. Accordingly, the message including the measurement information may indicate to the target network node that the at least one beam measurement has changed.

In some embodiments, the triggering event corresponds to determining to perform a RACH fallback procedure after sending a random-access attempt to the target node and not receiving a random-access response within a random-access response window. For example, during a handover procedure, if the wireless device does not receive a random-access response, that may indicate that the RACH fallback procedure must be used. It may further indicate that the beam measurement information at the target node may be out of date, thereby indicating to the wireless device to send measurement information that is more current.

At step 940, the wireless device determines measurement information to include in a message to send to the target network node. The measurement information may be obtained by measuring one or more beams according to one of a radio link management configuration, a beam management configuration, and a measurement configuration. For example, the wireless device may determine what measurement information to include and/or what message to use to send the measurement information according to the embodiments disclosed in sections "Which measurements are reported" and "How the UE decides which measurements to be included in the measurement report to target upon accessing" above. In some embodiments, determining the measurement information may be according to a previously received configuration from the source network node. In some embodiments, determining the measurement information includes performing beam measurements to be included in the message, e.g., in accordance to the configuration information received form the source node.

At step 960, the wireless device, in response to detecting the triggering event, sends the determined measurement information in the message to the target network node. As described above, the measurement information may be sent in any suitable message, e.g., the handover complete message, a Msg3 in a random-access procedure, etc. In some embodiment, the message indicates measurements associated with a set of downlink beams, where at least one of the downlink beams in the set is not a best beam. For example, the measurements may be associated with more than just a single beam. In this manner, the wireless device may provide the most up-to-date measurement information for the target network node.

Figure 21:
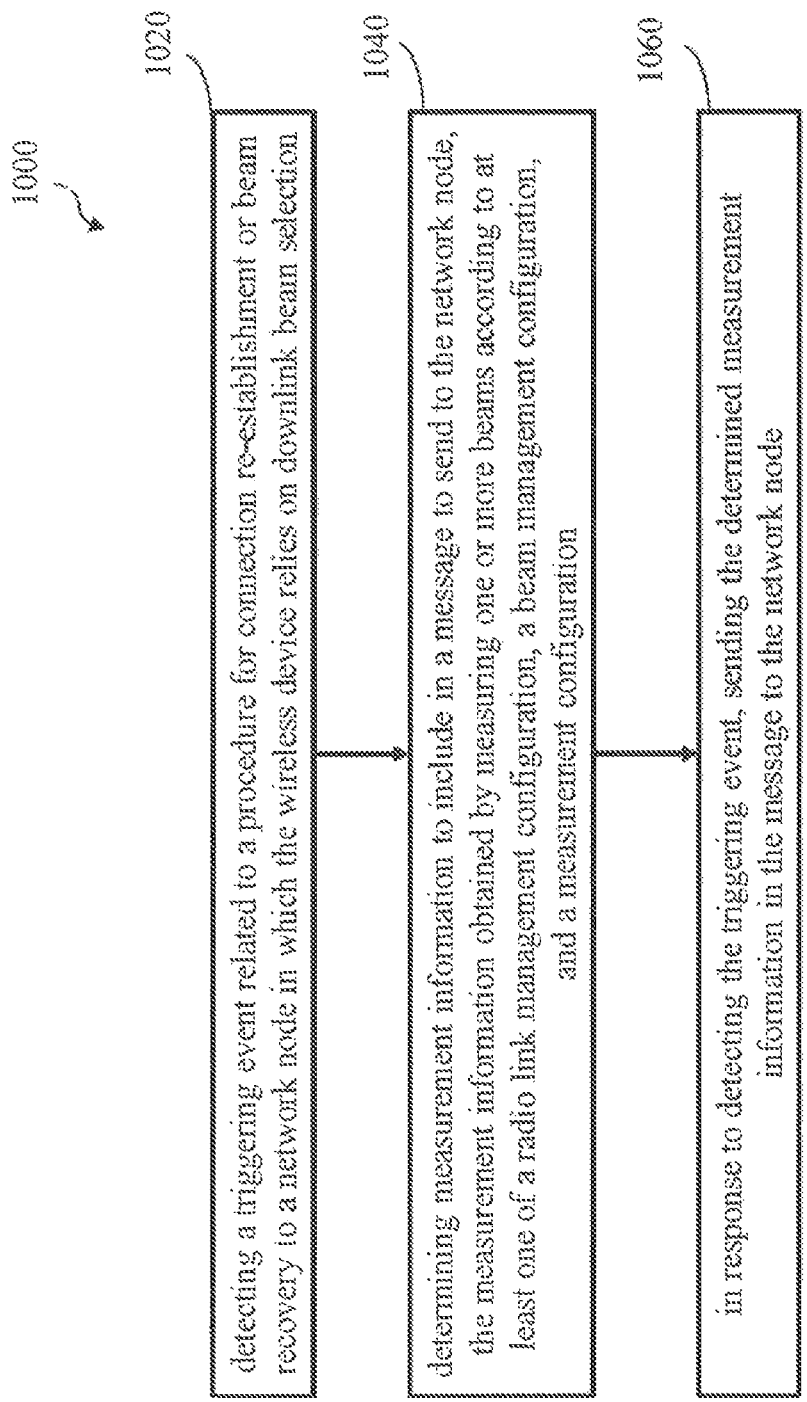
FIG. 21 illustrates a third example method performed by a wireless device, in accordance with certain embodiments.

FIG. 21 illustrates an example flowchart diagram of a method 1000 for use in a wireless device, such as wireless device 110, 200, 330, 491, 492, or 530 described above. At step 1020, the wireless device detects detecting a triggering event related to a procedure for connection re-establishment or beam recovery to a network node in which the wireless device relies on downlink beam selection. This differs from method 900 in that the triggering event is not related to a handover procedure. For example, in certain embodiments, the triggering event corresponds to a detection of beam failure towards a source network node. In this manner, the wireless device may determine that an update to the measurement information may be warranted, e.g., because it has been too long since it last connected with the network node or if the beam failed, then there may be better beams to use.

At step 1040, the wireless device determines measurement information to include in a message to send to the network node. The measurement information may be obtained by measuring one or more beams according to one of a radio link management configuration, a beam management configuration, and a measurement configuration. At step 1060, in response to detecting the triggering event, the wireless device sends the determined measurement information in the message to the network node. How the measurement information may be determined and sent to the network node may be described in reference to the previously described embodiments, including with reference to method 900 above.

Figure 22:
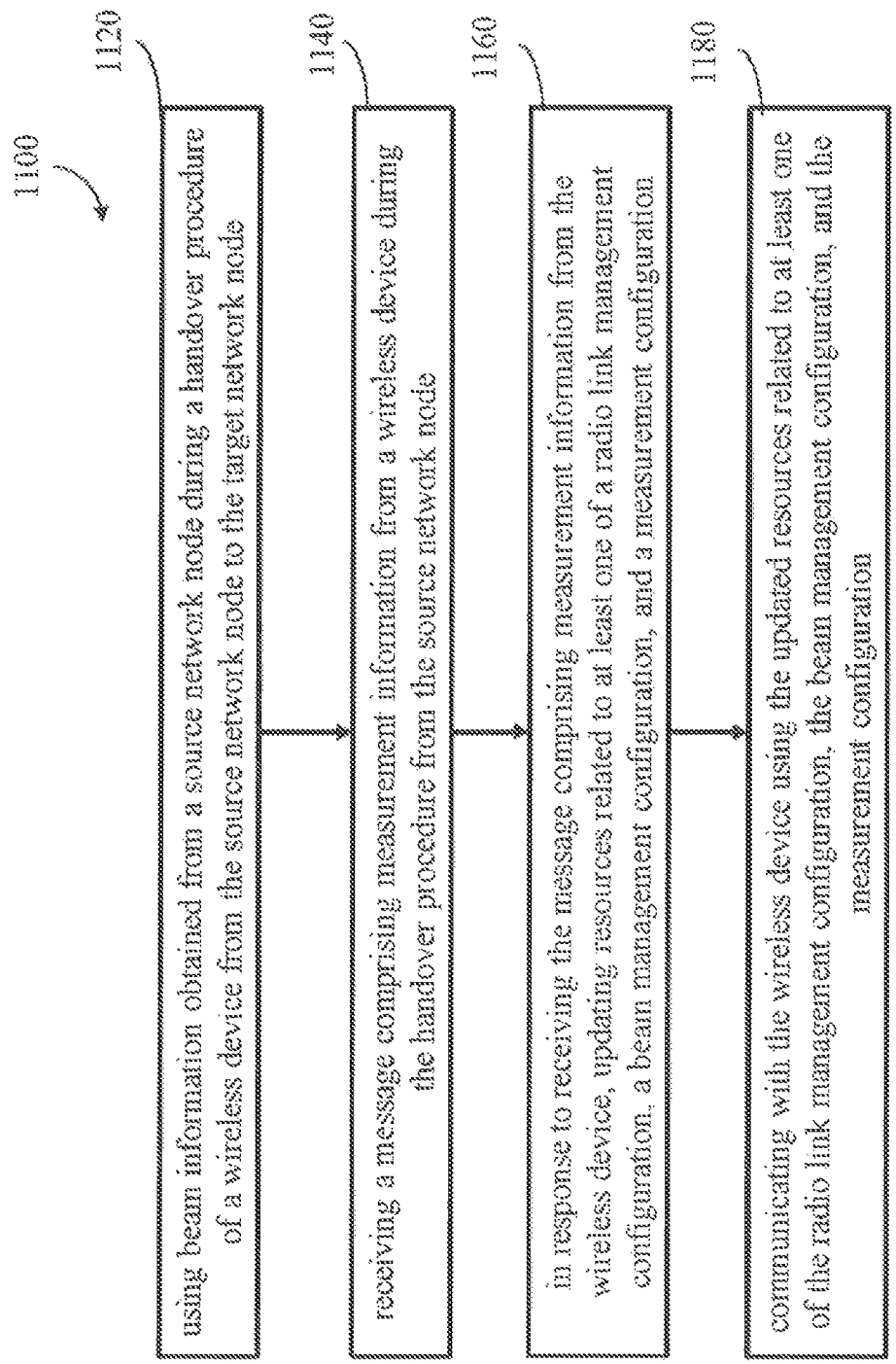
FIG. 22 illustrates an example method performed by a network node, in accordance with certain embodiments.

FIG. 22 illustrates an example flowchart diagram of a method 1100 for use in a network node, such as network node 160, 330, 412, or 520 described above. Method 1100 may begin at step 1120, wherein beam information obtained from a source network node during a handover procedure of a wireless device from the source network node to the target network node is used. For example, the network node may use the beam information to contact the wireless device to initiate or continue the handover procedure.

At step 1140, the network node receives a message comprising measurement information from a wireless device during the handover procedure from the source network node. For example, the network node may receive the message as described in FIGS. 9 and 10 above. In some embodiments, the network node receives the message comprising measurement information from the wireless device before the network node sends any beam measurement configuration request to the wireless device. In this manner, the network node may adjust the configuration information without sending the request, thereby reducing the time using out-of-date configurations. The message may be received in any suitable message after the wireless device is triggered, e.g., in a Msg3 of a random-access procedure with the wireless device or in a handover complete message.

At step 1160, in response to receiving the message comprising measurement information from the wireless device, the network node updates resources related to one of a radio link management configuration, a beam management configuration, and a measurement configuration. For example, it may update a set of beams to be configured for the wireless device, including changing what beams are included in the set or which is the best beam for downlink.

At step 1180, the network node may communicate with the wireless device using the updated resources related one of the radio link management configuration, the beam management configuration, and the measurement configuration. For example, the network node may change what downlink beams it uses to communicate with the wireless device or may change which beams the wireless device is configured for measurement and/or use. In this manner, the network node may adjust the configuration using up-to-date measurements from the wireless device without having to request those measurements after the handover procedure is completed.

Figure 23:
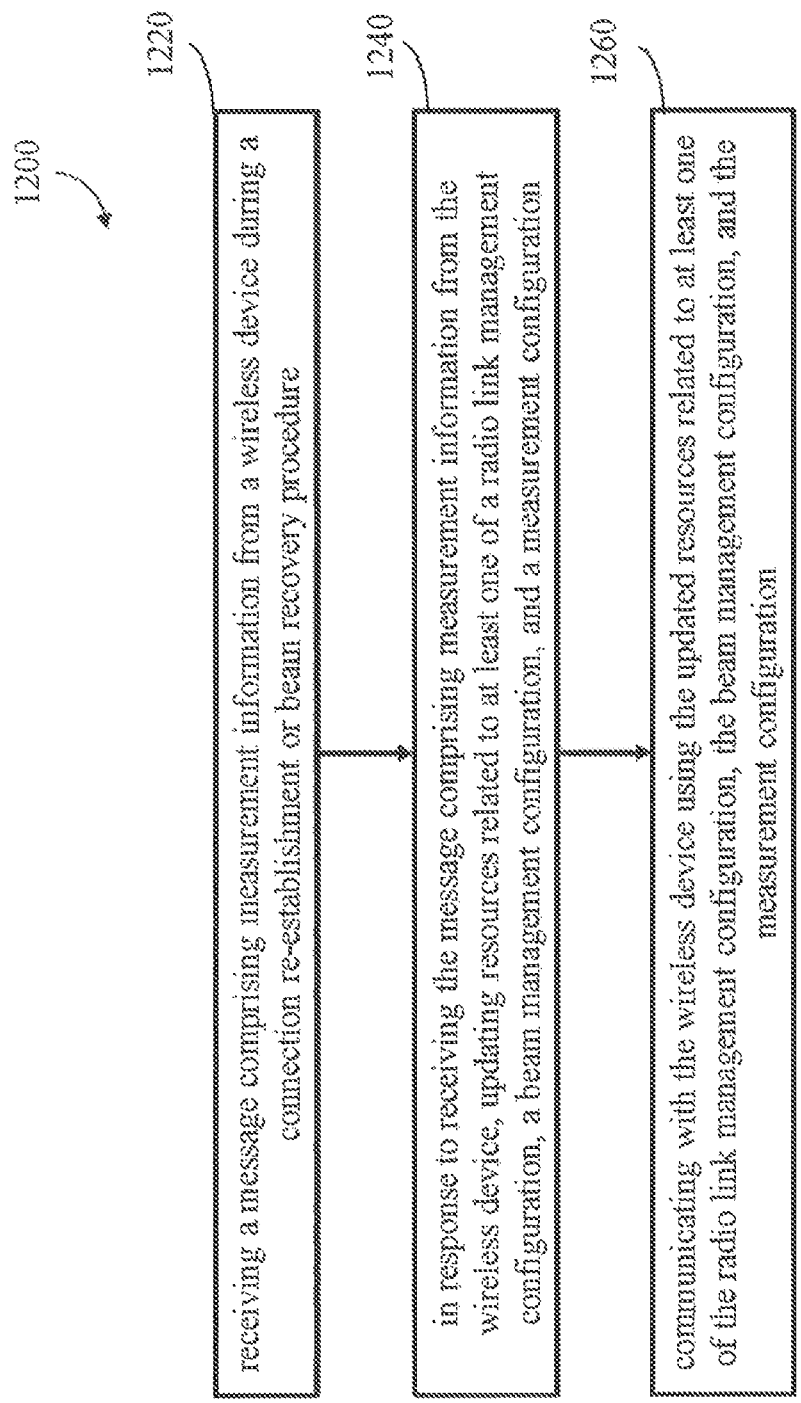
FIG. 23 illustrates a second example method performed by a network node, in accordance with certain embodiments.

FIG. 23 illustrates an example flowchart diagram of a method 1200 for use in a network node, such as network node 160, 330, 412, or 520 described above. Method 1200 may begin at step 1220, wherein the network node receives a message comprising measurement information from a wireless device during a connection re-establishment or beam recovery procedure. This differs from FIG. 22 in that the measurement information is not received during a handover procedure but during a connection re-establishment or beam recovery procedure. The wireless device may be configured to trigger sending the message in these scenarios for the reasons described previously.

Steps 1240 and 1260 correspond to similar steps 1160 and 1180 of method 1100 depicted in FIG. 22. Similar to FIG. 22, at step 1240, the network node may, in response to receiving the message comprising measurement information from the wireless device, update resources related to one of a radio link management configuration, a beam management configuration, and a measurement configuration. At step 1260, the network node may communicate with the wireless device using the updated resources related one of the radio link management configuration, the beam management configuration, and the measurement configuration. Method 1200 may differ based on the different triggering condition, which may have an effect on what measurement information is received by the network node and how the network node continues communicating with the wireless device.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A method performed by a wireless device in a network, the method comprising:
    detecting a triggering event related to a procedure for a handover from a source network node to a target network node in which the wireless device relies on downlink beam selection;
    determining measurement information to include in a message to send to the target network node, the measurement information obtained by measuring one or more beams according to at least one of a radio link management configuration, a beam management configuration, and a measurement configuration; and
    in response to detecting the triggering event, sending the determined measurement information in the message to the target network node;
    wherein detecting the triggering event comprises determining that at least one beam measurement chanted after reporting the beam measurement to the source network node.

2. A wireless device comprising:
    a memory configured to store instructions; and
    processing circuitry configured to execute the instructions;
    wherein the processing circuitry is configured to:
        detect a triggering event related to a procedure for a handover from a source network node to a target network node in which the wireless device relies on downlink beam selection;
        determine measurement information to include in a message to send to the target network node, the measurement information obtained by measuring one or more beams according to at least one of a radio link management configuration, a beam management configuration, and a measurement configuration; and in response to detecting the triggering event, send the determined measurement information in the message to the target network node;

wherein detecting the triggering event comprises determining that at least one beam measurement chanted after reporting the beam measurement to the source network node.

3. The wireless device of claim 2, wherein the triggering event corresponds to receipt of a handover command or a conditional handover command.

4. The wireless device of claim 2, wherein:
the message including the measurement information indicates to the target network node that the at least one beam measurement has changed, wherein the message is sent to the target network node prior to completing the handover procedure.

5. The wireless device of claim 2, wherein determining that at least one beam measurement has changed comprises one or more of:
determining that a strongest beam has changed; and
determining that a power, a quality, or an interference associated with the at least one beam has changed.

6. The wireless device of claim 2, wherein the triggering event corresponds to determining to perform a random-access channel (RACH) fallback procedure after sending a random-access attempt to the target node and not receiving a random-access response within a random-access response window.

7. The wireless device of claim 2, wherein the message including the measurement information is sent after receiving a random-access response from the target node.

8. The wireless device of claim 7, wherein the measurement information is included in a Msg3 of a random-access procedure with the target node or in a handover complete message.

9. The wireless device of claim 2, wherein the message including the measurement information indicates measurements associated with a set of downlink beams, wherein at least one of the downlink beams in the set is not a best beam.

10. The wireless device of claim 2, wherein the message including the measurement information comprises measurement information associated to synchronization signal/physical broadcast channel (SS/PBCH) blocks, measurement information associated to channel state information reference signal (CSI-RS) resources, or both.

11. The wireless device of claim 2, wherein determining the measurement information comprises determining which types of events to configure as triggering events.

12. The wireless device of claim 2, wherein the wireless device is further configured to determine which message to use to send the measurement information.

13. The wireless device of claim 2, wherein determining measurement information comprises determining which measurements to include in the message.

14. The wireless device of claim 2, wherein determining measurement information comprises determining which measurements to be included in the message to the target network node upon accessing.

15. The wireless device of claim 2, wherein the wireless device is further configured to perform measurements to be included in the message including the measurement information to the target network node upon accessing.

* * * * *

UNITED STATES PATENT AND TRADEMARK OFFICE
CERTIFICATE OF CORRECTION

PATENT NO. : 11,419,015 B2
APPLICATION NO. : 16/316431
DATED : August 16, 2022
INVENTOR(S) : Da Silva et al.

It is certified that error appears in the above-identified patent and that said Letters Patent is hereby corrected as shown below:

In the Specification

In Column 1, Line 8, delete "PCT/SE20.18/051287" and insert -- PCT/SE2018/051207 --, therefor.

In Column 14, Line 12, delete "equipped" and insert -- equipment --, therefor.

In Column 14, Line 21, delete "(RRU)" and insert -- (RRU), --, therefor.

In Column 14, Line 22, delete "multi-standard" and insert -- multi-standard radio --, therefor.

In Column 26, Lines 29-30, delete "Radio front end circuitry 114" and insert -- Radio front end circuitry 112 --, therefor.

In Column 29, Line 6, delete "UE 2200" and insert -- UE 200 --, therefor.

In Column 29, Lines 23-24, delete "power source 233," and insert -- power source 213, --, therefor.

In Column 30, Line 62, delete "(SIM/RUIM) module," and insert -- module (SIM/RUIM), --, therefor.

In Column 37, Line 6, delete "substep 830" and insert -- step 830 --, therefor.

In Column 41, Lines 62-63, delete "performs the of the" and insert -- perform the method of the --, therefor.

In Column 44, Line 46, delete "form" and insert -- from --, therefor.

Signed and Sealed this
Seventh Day of March, 2023

Katherine Kelly Vidal
*Director of the United States Patent and Trademark Office*

CERTIFICATE OF CORRECTION (continued)
U.S. Pat. No. 11,419,015 B2

In the Claims

In Column 46, Line 49, in Claim 1, delete "chanted" and insert -- changed --, therefor.

In Column 47, Line 5, in Claim 2, delete "chanted" and insert -- changed --, therefor.